US010220652B2

(12) United States Patent
Dunlap, III

(10) Patent No.: US 10,220,652 B2
(45) Date of Patent: Mar. 5, 2019

(54) DAMPER ASSEMBLY

(71) Applicant: SRAM, LLC, Chicago, IL (US)

(72) Inventor: Charles Emmett Dunlap, III, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/067,571

(22) Filed: Mar. 11, 2016

(65) Prior Publication Data

US 2017/0259614 A1    Sep. 14, 2017

(51) Int. Cl.
| *B60B 1/00* | (2006.01) |
| *F16F 15/12* | (2006.01) |
| *B60B 27/00* | (2006.01) |
| *B60B 19/00* | (2006.01) |
| *B60B 1/04* | (2006.01) |
| *B60B 27/02* | (2006.01) |
| *B60B 5/02* | (2006.01) |
| *B62K 25/04* | (2006.01) |

(52) U.S. Cl.
CPC .............. *B60B 1/003* (2013.01); *B60B 19/00* (2013.01); *B60B 27/0047* (2013.01); *B60B 27/0052* (2013.01); *F16F 15/1201* (2013.01); *B60B 1/041* (2013.01); *B60B 1/043* (2013.01); *B60B 5/02* (2013.01); *B60B 27/023* (2013.01); *B60B 2360/32* (2013.01); *B60B 2360/50* (2013.01); *B60B 2900/131* (2013.01); *B62K 2025/042* (2013.01); *B62K 2201/02* (2013.01)

(58) Field of Classification Search
CPC ......... B60B 1/041; B60B 1/042; B60B 1/043; B60B 1/00; B60B 1/003; B60B 1/02; B60B 5/02; B60B 27/0052; B60B 27/023; B60B 2900/131; B60B 19/00; B60B 27/0047; F16F 15/1201

See application file for complete search history.

(56) References Cited

U.S. PATENT DOCUMENTS

| 1,542,058 A | 6/1925 | Kelly | |
| 3,843,188 A * | 10/1974 | Kirschner | ........... B60B 17/0017 188/379 |
| 3,879,089 A * | 4/1975 | Stults | .................... B60B 7/0006 301/37.107 |
| 4,463,990 A * | 8/1984 | Beisch | ...................... B60B 7/18 29/894.38 |
| 6,339,323 B1 * | 1/2002 | Muraoka | ................. B60B 1/003 280/288.4 |

(Continued)

FOREIGN PATENT DOCUMENTS

| CN | 100448718 C | 1/2009 |
| DE | 583902 | 9/1933 |

(Continued)

OTHER PUBLICATIONS

Biketeile.Ch, "Silpad", At least prior to Mar. 11, 2016, (3 pages).

*Primary Examiner* — Kip T Kotter

(57) ABSTRACT

A bicycle wheel assembly may include a rim, a hub assembly, a plurality of spokes and a damper assembly. The damper assembly includes a damping element configured to apply a damping force against at least one spoke of the plurality of spokes. The damping force may be applied in an axial direction of the bicycle wheel and/or to a segment of the at least one spoke near the hub assembly.

29 Claims, 19 Drawing Sheets

(56) References Cited

U.S. PATENT DOCUMENTS

| | | | |
|---|---|---|---|
| 6,550,868 B2 | 4/2003 | Kobayashi et al. | |
| 6,676,225 B1 * | 1/2004 | Baxter | B60B 1/02 |
| | | | 280/288.4 |
| 9,067,465 B2 * | 6/2015 | Erler | B60B 1/00 |
| 2003/0173821 A1 | 9/2003 | Chen | |
| 2004/0245847 A1 * | 12/2004 | Hasegawa | B60B 1/06 |
| | | | 301/37.33 |
| 2006/0170277 A1 | 8/2006 | Passarotto | |
| 2007/0200422 A1 * | 8/2007 | Davis | B60B 1/003 |
| | | | 301/95.106 |
| 2010/0090518 A1 * | 4/2010 | Schiers | B29C 70/342 |
| | | | 301/55 |

FOREIGN PATENT DOCUMENTS

| | | |
|---|---|---|
| EP | 1281540 B1 | 4/2006 |
| EP | 1685979 A1 | 8/2006 |
| EP | 2559568 A1 | 2/2013 |
| FR | 2513185 | 9/1981 |
| FR | 2493770 A1 | 5/1982 |
| GB | 581845 A | 10/1946 |
| JP | H07-246801 | 9/1995 |
| JP | 2004131021 | 4/2004 |

\* cited by examiner

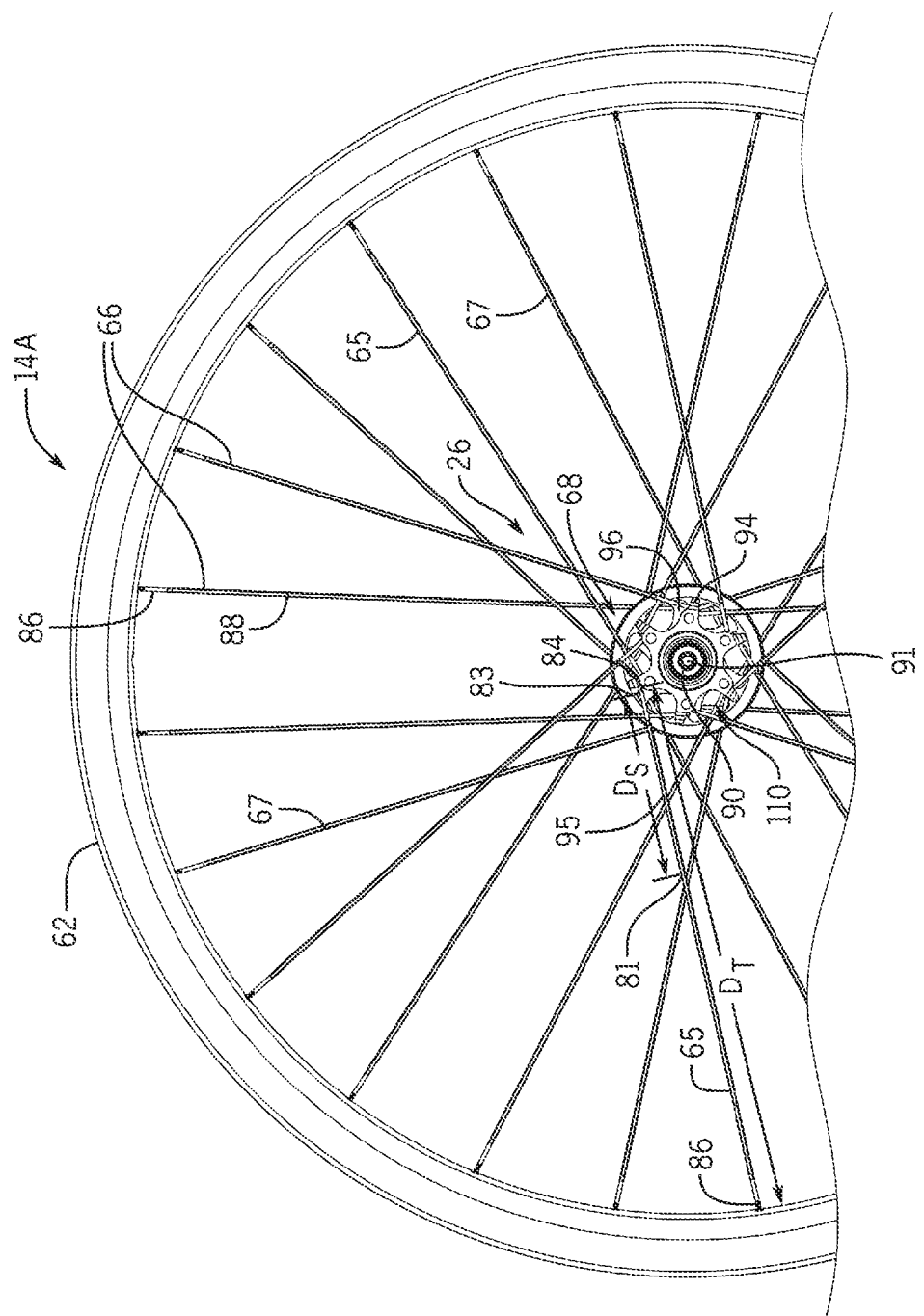

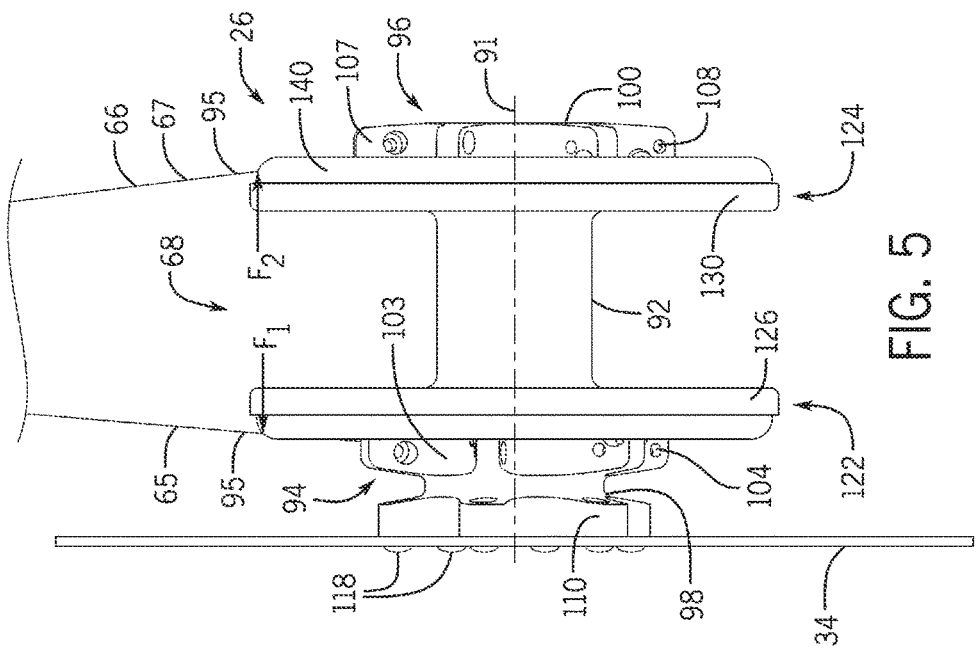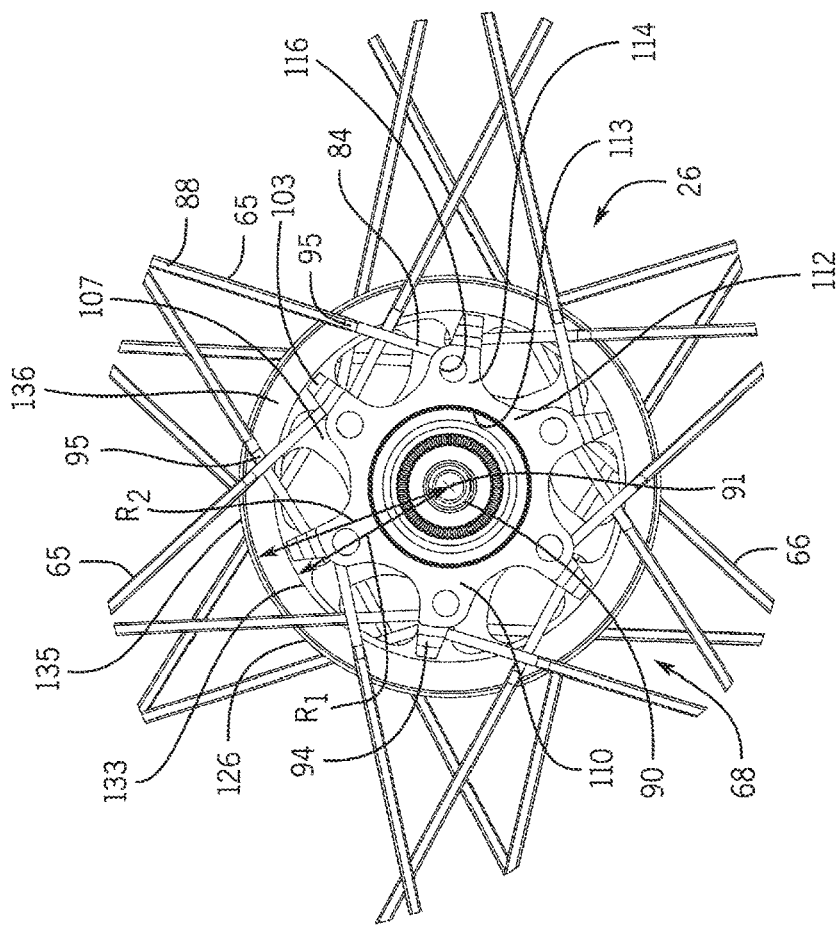

DAMPER ASSEMBLY

BACKGROUND OF THE INVENTION

Disc brake systems for bicycles have become very popular with bicyclists. Disc brake systems provide substantial braking power in relationship to the amount of braking force applied to the brake lever. Moreover, disc brake systems typically provide a high level of braking consistency in all types of weather and riding conditions. However, one problem associated with disc brake systems is that they may induce vibration and noise in bike components such as wheels, brake rotors, and even bike frames, especially during wet conditions. The disc brake noise is loud and highly undesirable to the rider, sometimes exceeding a sound level of 90 dBA under wet conditions.

The disc brake noise may occur when a rider actuates their brakes causing the brake pads to momentarily and alternatingly stick and unstick when the pad/rotor interface slips at a system frequency determined by the frame, rotor and wheel stiffness. The brake rotor may become excited by this stick-slip condition, causing a vibration in the hub and/or spokes. The vibrating spokes may generate noise and excite other parts of the wheel, which may generate additional noise. Therefore, there is a need to dampen or eliminate the vibrations of the spokes during disc brake actuation to reduce disc brake noise.

SUMMARY

In an embodiment, a bicycle wheel assembly comprises a rim, a hub assembly, a plurality of spokes and a damper assembly. The hub assembly comprises a hub body and first and second spoke attachment members. The hub body is disposed about a hub axis and rotatable with respect to the hub axis. The hub body includes a first hub body end and a second hub body end spaced apart from the first hub body end along the hub axis. The first and second spoke attachment members are disposed about the hub axis and proximate the first and second hub body ends, respectively. The first spoke attachment member includes a plurality of first spoke-receiving openings and the second spoke attachment member includes a plurality of second spoke-receiving openings. The plurality of spokes comprises a plurality of first spokes extending between the rim and the first spoke attachment member and a plurality of second spokes extending between the rim and the second spoke attachment member. The damper assembly comprises a first damper applying a first axial damping force against at least one first spoke of the plurality of first spokes, and a second damper applying a second axial damping force against at least one second spoke of the plurality of second spokes.

In an embodiment, a hub assembly for a bicycle wheel assembly comprises a hub axle, a hub body, first and second spoke attachment members, a brake rotor attachment member and a damper assembly. The hub body is coaxially disposed about the hub axle and rotatable with respect to the hub axle. The hub body includes a first hub body end and a second hub body end spaced apart from the first hub body end along the hub axle. The first and second spoke attachment members are disposed about the hub axle and proximate the first and second hub body ends, respectively. The first spoke attachment member includes a plurality of first spoke-receiving openings and the second spoke attachment member includes a plurality of second spoke-receiving openings. The brake rotor attachment member is disposed outboard of the first spoke attachment member along the hub axle. The damper assembly comprises a first damper configured to apply a first damping force against at least one first spoke extending from the plurality of first spoke-receiving openings, and a second damper configured to apply a second damping force against at least one second spoke extending from the plurality of second spoke-receiving openings. The first damper is disposed inboard of the brake rotor attachment member along the hub axle.

In an embodiment, a bicycle wheel assembly comprises a rim, a hub assembly, a plurality of spokes and a damper assembly. The hub assembly comprises a hub body and first and second spoke attachment members. The hub body is disposed about a hub axis and rotatable with respect to the hub axis. The hub body includes a first hub body end and a second hub body end spaced apart from the first hub body end along the hub axis. The first and second spoke attachment members are disposed about the hub axis and proximate the first and second hub body ends, respectively. The first spoke attachment member includes a plurality of first spoke-receiving openings. The second spoke attachment member includes a plurality of second spoke-receiving openings. Each spoke of the plurality of spokes have first and second spoke ends. The first spoke end is attached to one of the first and second spoke attachment members. The second spoke end is attached to the rim. The damper assembly comprises a first damping element applying a first damping force against at least one spoke segment of at least one spoke of the plurality of spokes. The spoke segment extends between a first spoke segment end and a second spoke segment end. The first spoke segment end is spaced apart from one of the first and second spoke attachment members. The second spoke segment end is located a first distance from one of the first and second spoke attachment members. The first distance is equal to one-third of a second distance between one of the first and second spoke attachment members and the second spoke end.

BRIEF DESCRIPTION OF THE DRAWINGS

In the drawings:

FIG. 3 is an enlarged detail side view of the wheel assembly of FIG. 2;

FIG. 4 is an enlarged detailed view of a hub assembly of the wheel assembly of FIG. 2;

FIG. 5 is an end view of the hub assembly of the wheel, assembly of FIG. 2, wherein only two spokes are attached to the hub assembly and a disc rotor is attached to a brake rotor attachment member;

Other aspects and advantages of the embodiments disclosed herein will become apparent upon consideration of the following detailed description, wherein similar or identical structures have similar or identical reference numerals.

DETAILED DESCRIPTION

Figure 1:
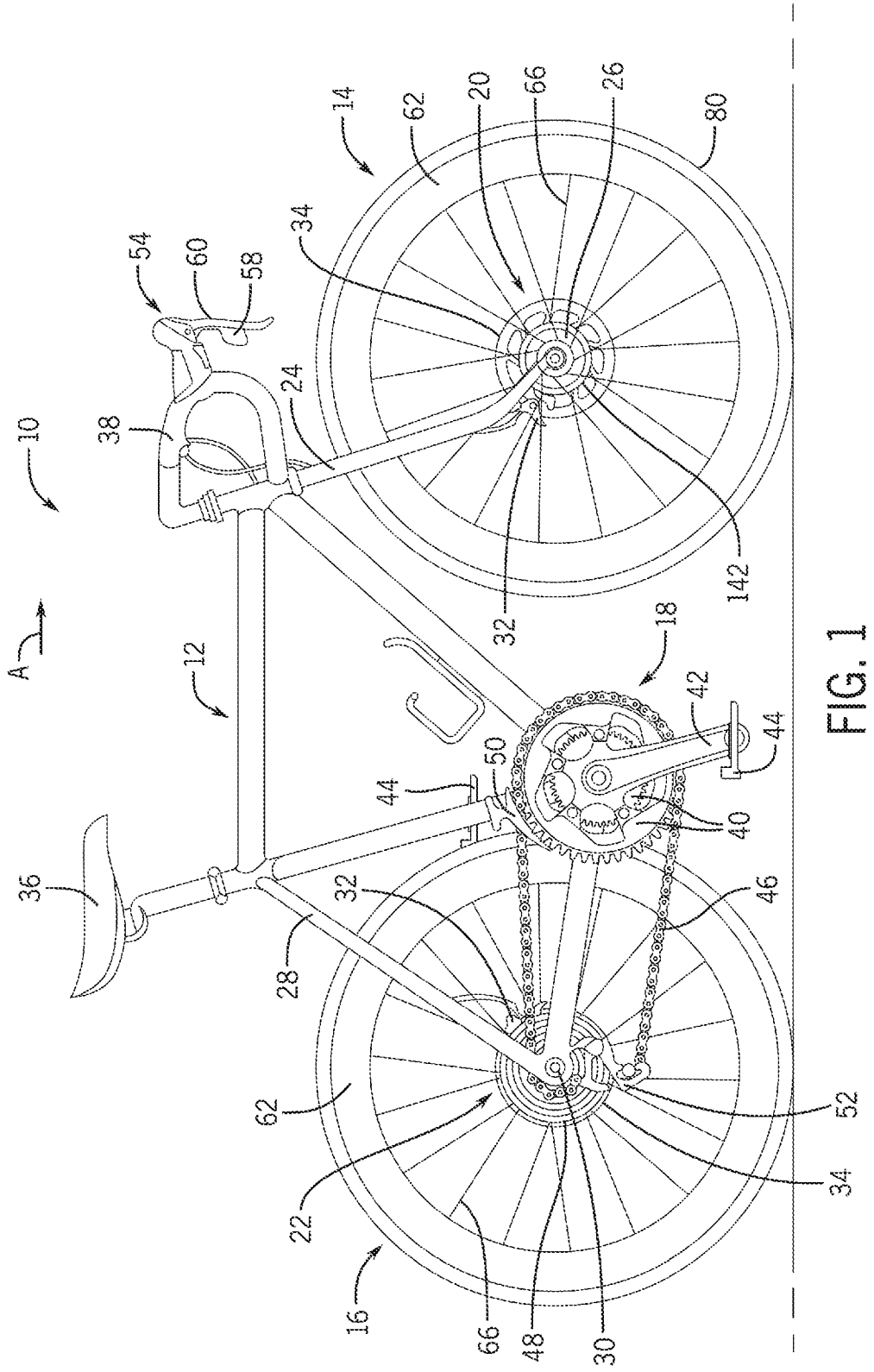
FIG. 1 is a side view of a bicycle equipped with a wheel assembly disclosed herein.
Figure 2:
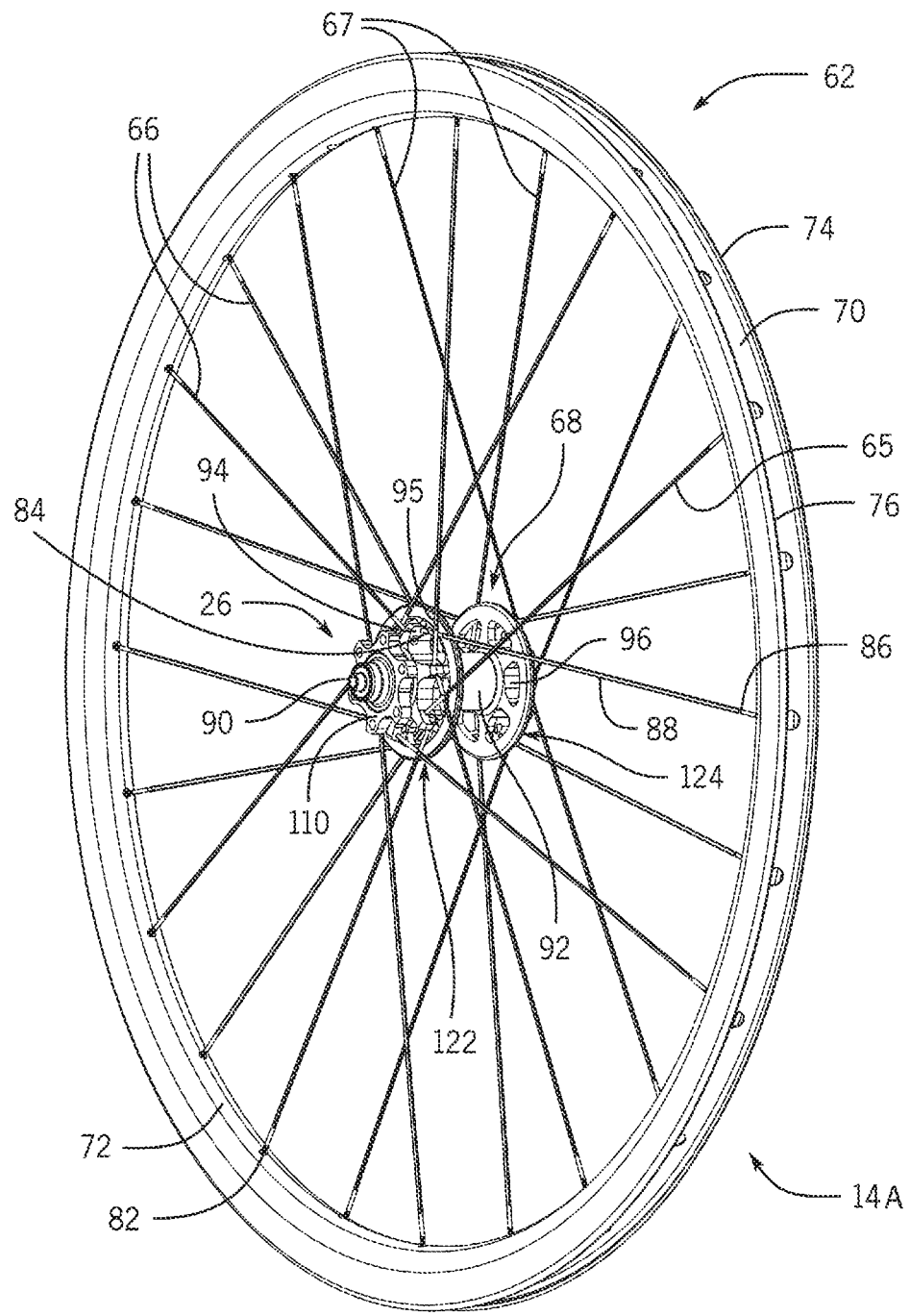
FIG. 2 is a perspective side view of a wheel assembly incorporating a damper assembly disclosed herein.
Figure 6:
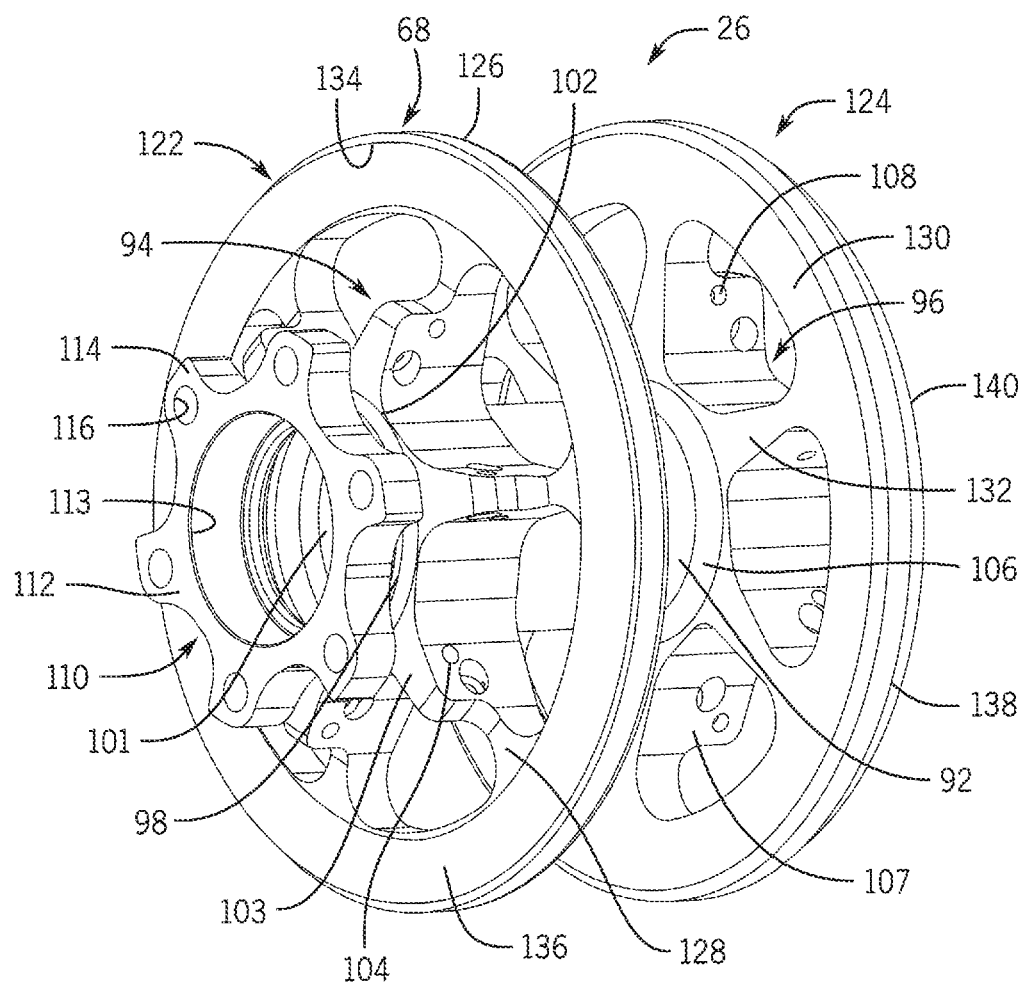
FIG. 6 is a perspective first side view of the hub assembly of the wheel assembly of FIG. 2.
Figure 7:
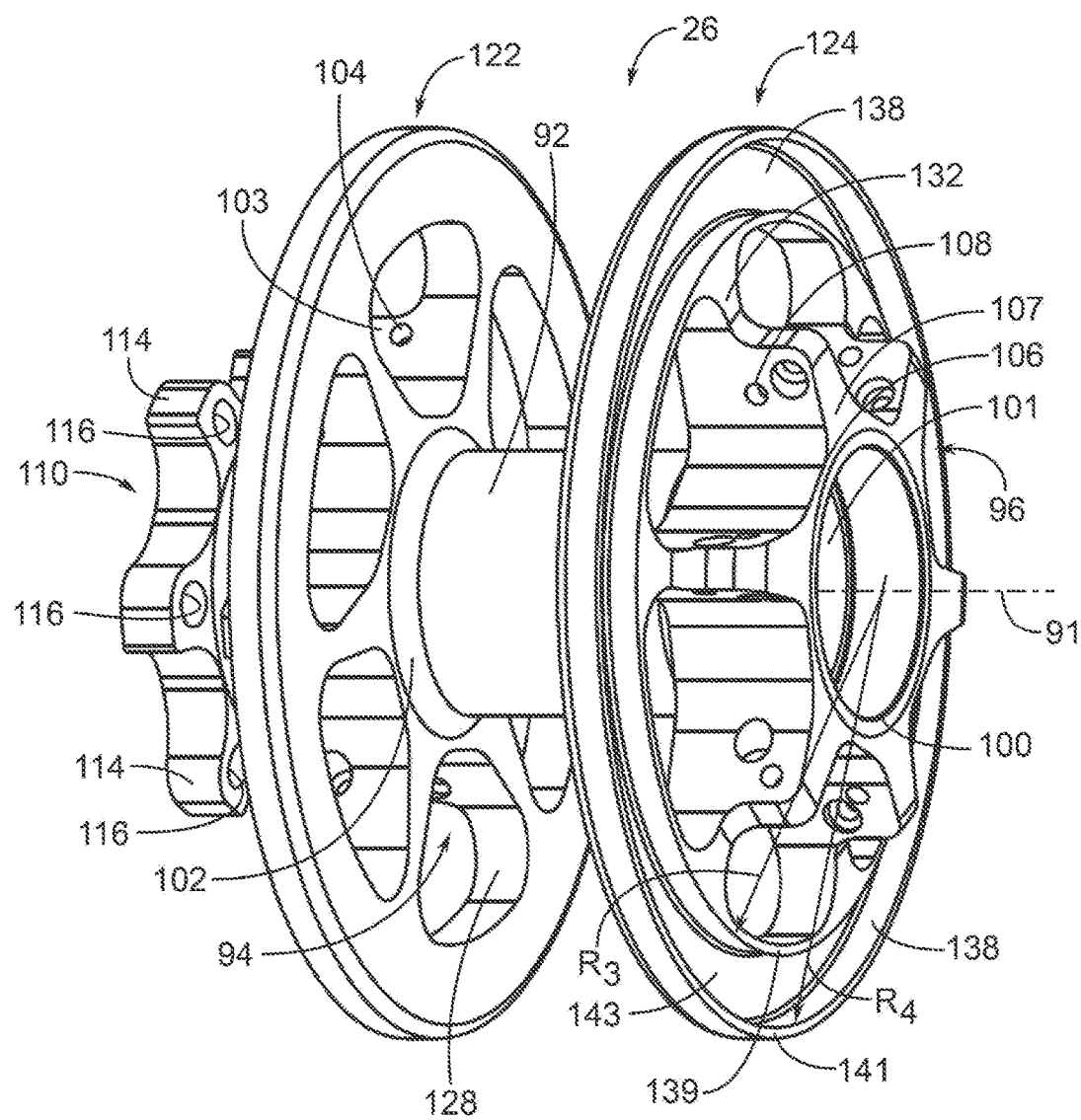
FIG. 7 is a perspective second side view of the hub assembly of the wheel assembly of FIG. 2.
Figure 8:
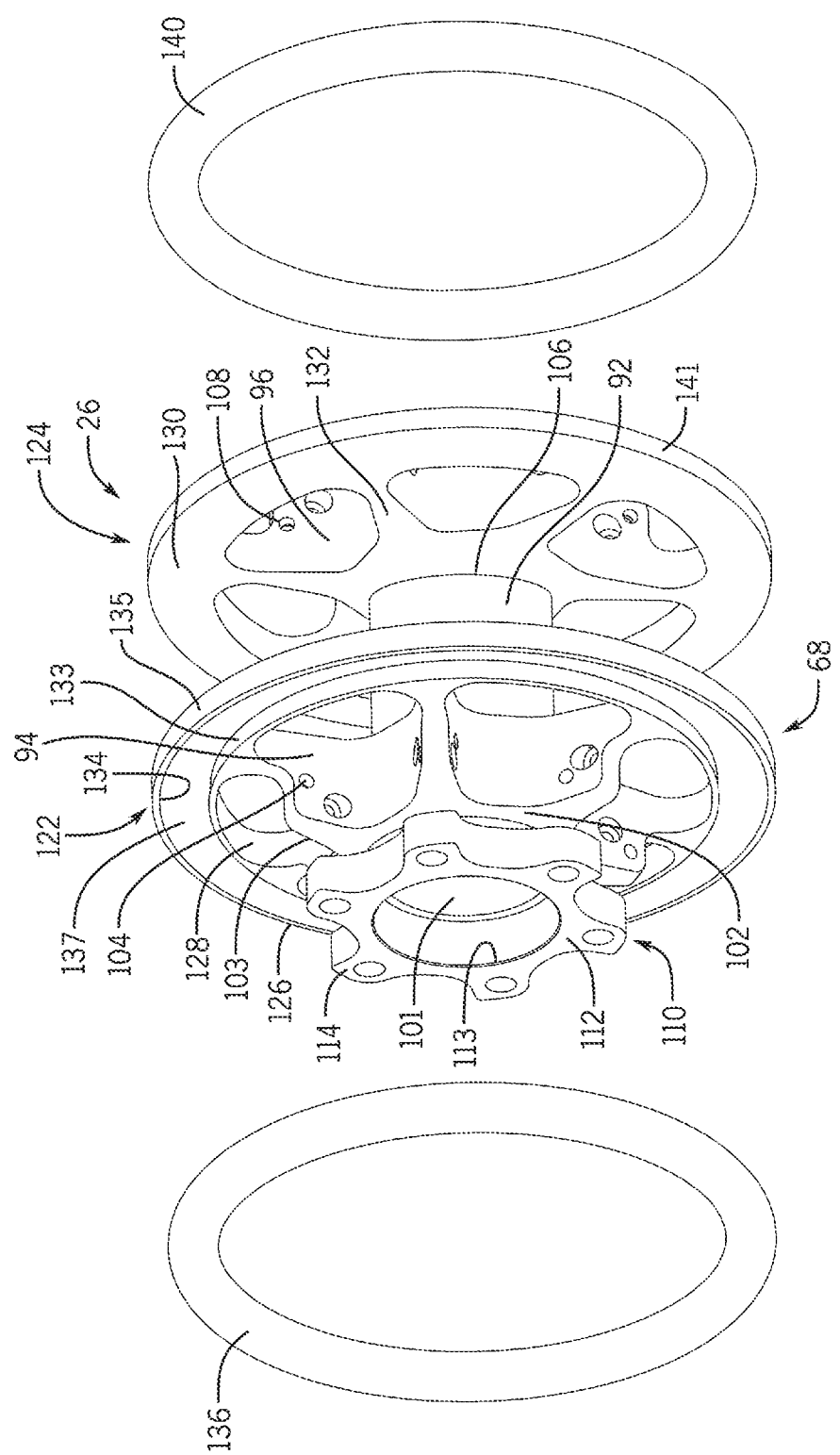
FIG. 8 is a partial exploded perspective side view of the hub assembly of the wheel assembly of FIG. 2.
Figure 9:
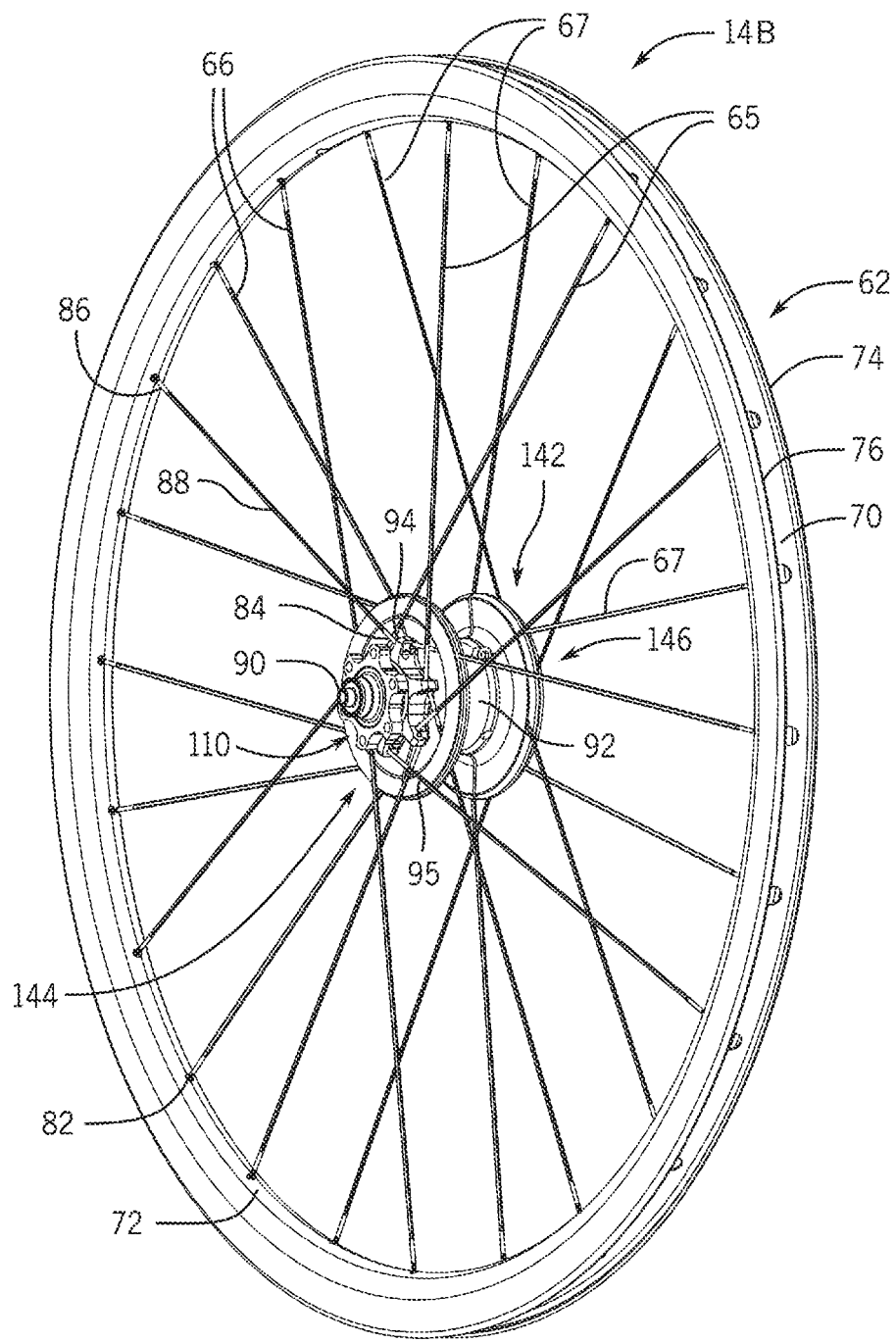
FIG. 9 is a perspective side view of the wheel assembly incorporating another embodiment of a damper assembly.
Figure 10:
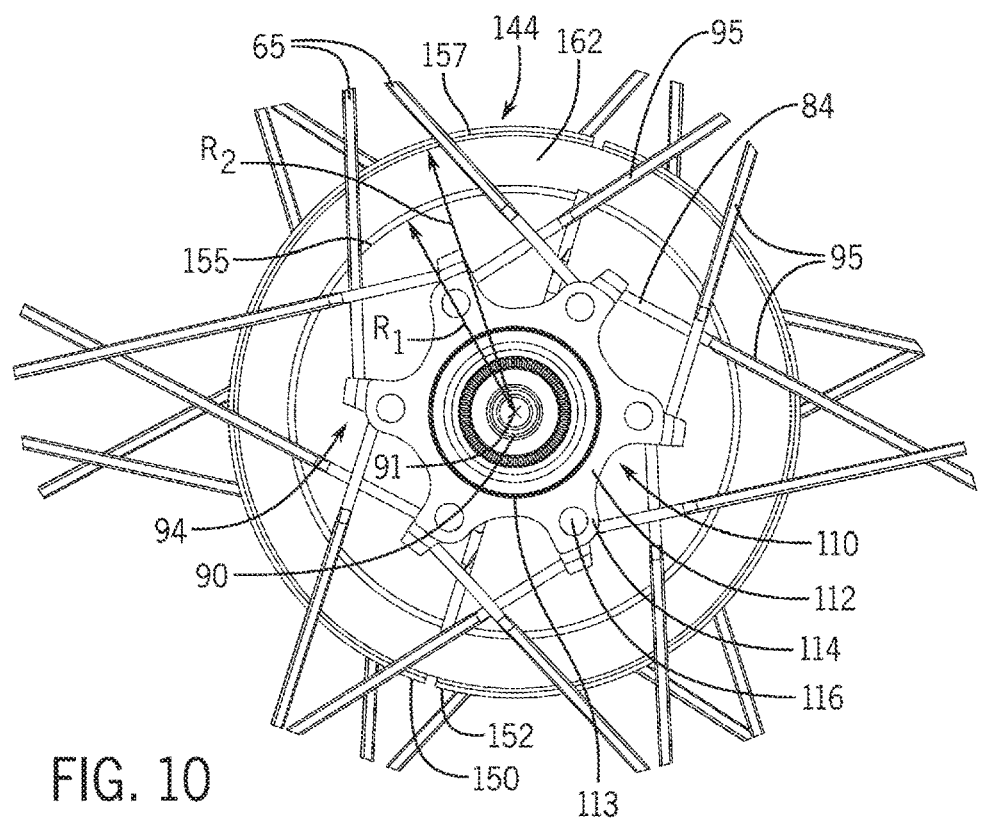
FIG. 10 is enlarged detailed side view of the hub assembly of the wheel assembly of FIG. 9.
Figure 11:
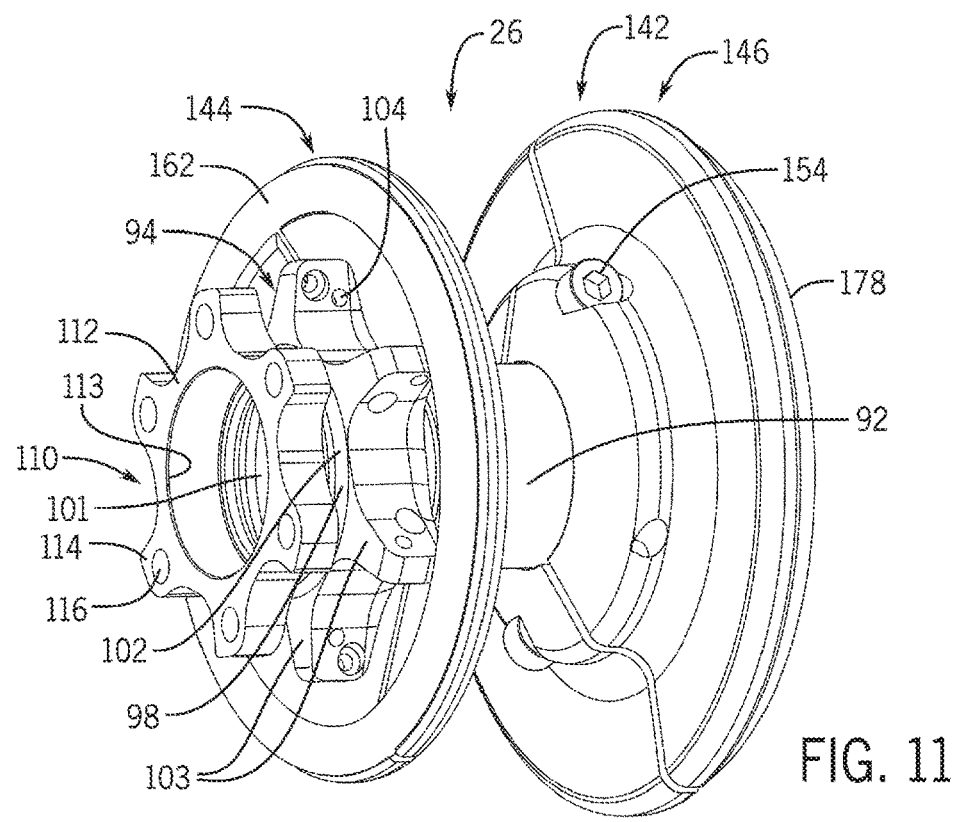
FIG. 11 is a perspective first side view of the hub assembly of the wheel assembly of FIG. 9.
Figure 12:
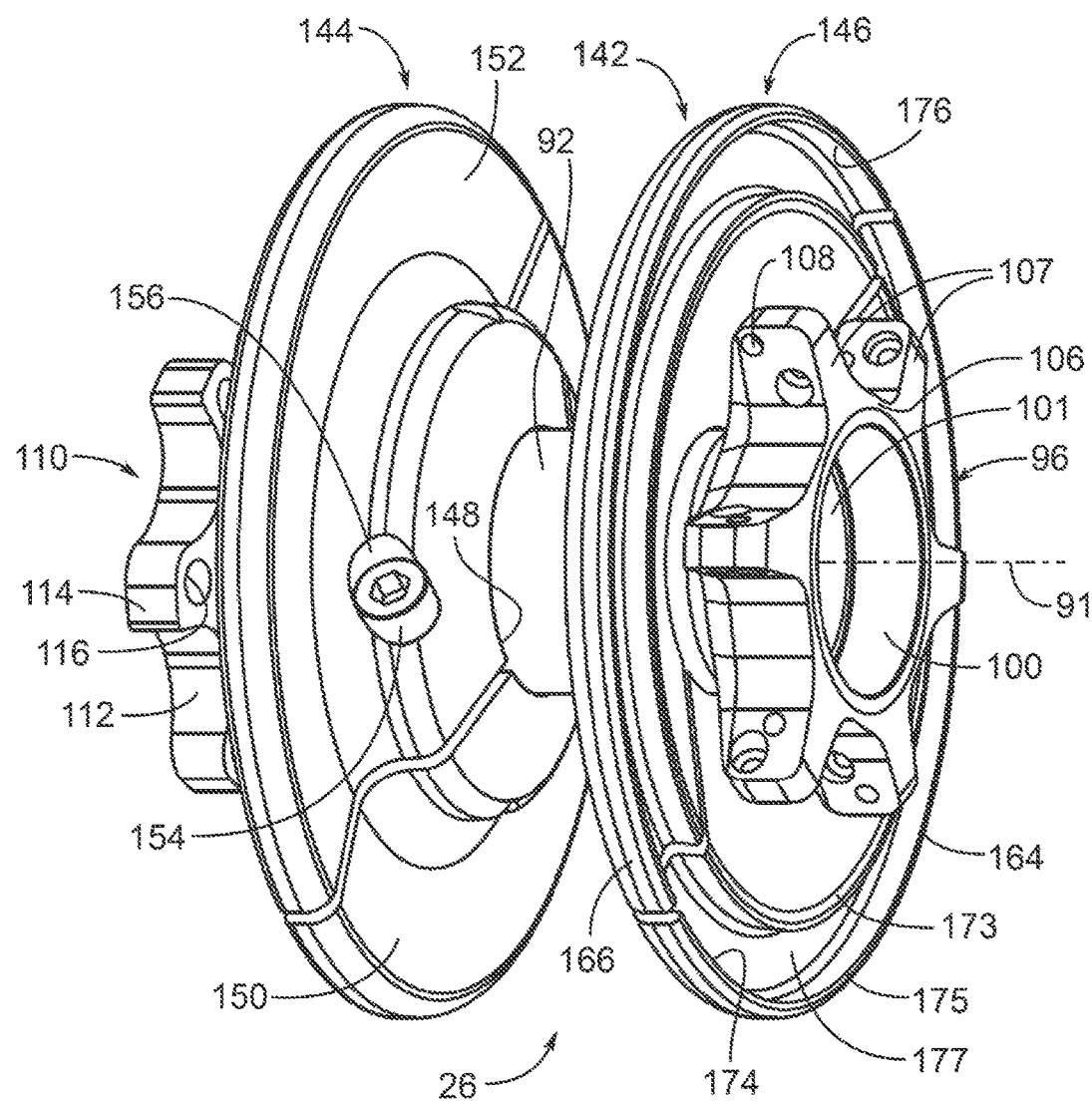
FIG. 12 is a perspective second side view of the hub assembly of the wheel assembly of FIG. 9.
Figure 13:
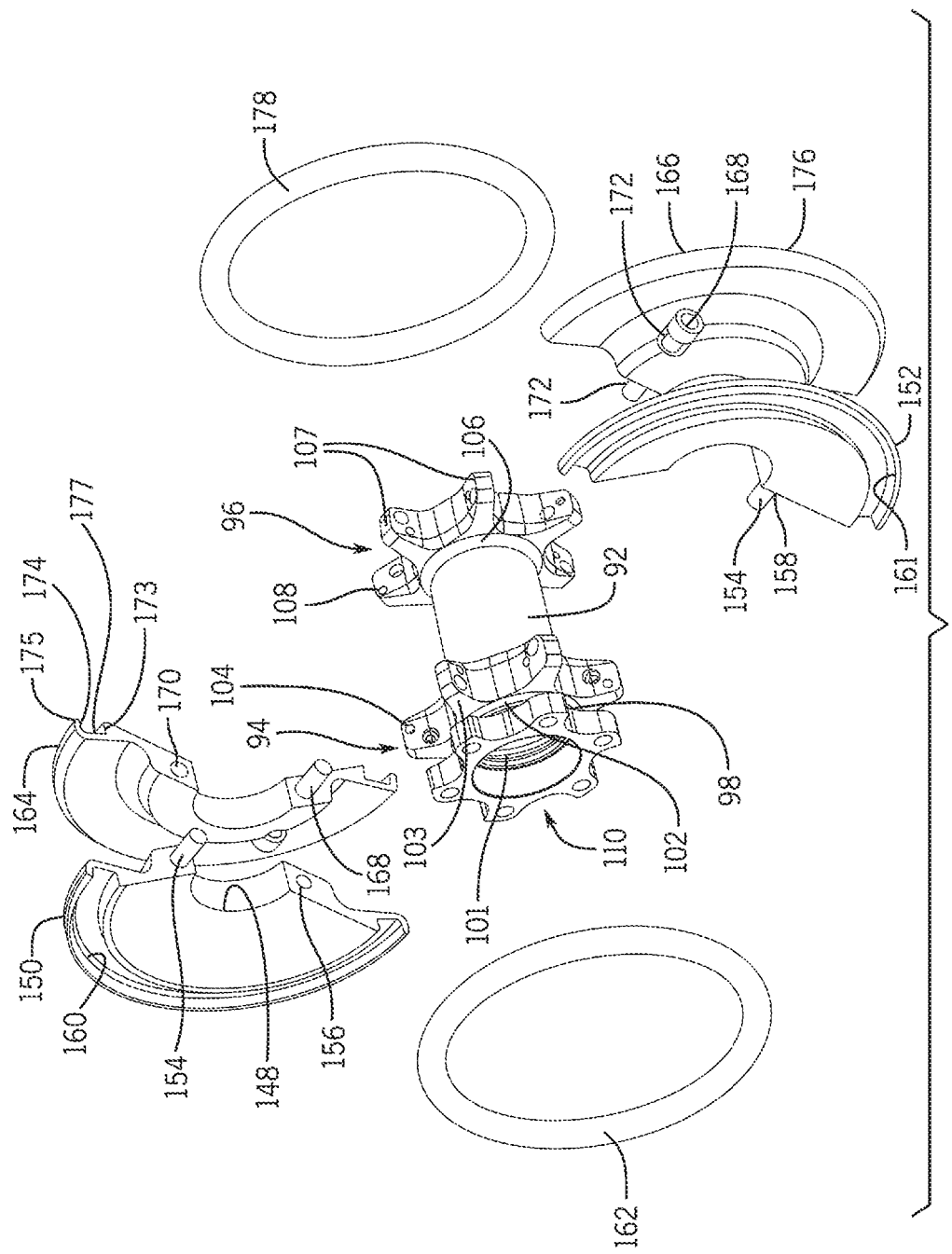
FIG. 13 is a partial exploded perspective view of the hub assembly of the wheel assembly of FIG. 9.

FIG. 1 generally illustrates a bicycle 10 that incorporates a wheel assembly including a damper assembly described herein. The bicycle 10 includes a frame 12, front and rear wheel assemblies 14, 16, a drivetrain 18, and front and rear disc brake assemblies 20, 22. The front wheel assembly 14 is rotatably coupled to a front fork 24 via a front hub assembly 26. The rear wheel assembly 16 is rotatably coupled to a rear fork 28 via a rear hub assembly 30. The front disc brake assembly 20 slows the rotation of the front wheel assembly 14 and the rear disc brake assembly 22 slows the rotation of the rear wheel assembly 16. Each of the disc brake assemblies 20, 22 include a caliper 32 connected to a disc brake rotor 34 mounted to the front or rear hub assembly 24, 26. A seat 36 is adjustably coupled to frame 12 and a handlebar 38 is coupled to front fork 24 for turning the front wheel assembly 14. A damper assembly 142 is included in the front and/or rear wheel assemblies 20, 22. The damper assembly is configured to contact the spokes to dampen noise of the wheel during braking.

The drivetrain 18 generally includes a plurality of front sprockets 40, a pair of crank arms 42 with pedals 44, a chain 46 and a plurality of rear sprockets 48. The plurality of front sprockets 40 are rotatably coupled to the frame 12 via a bottom bracket (not shown). The plurality of rear sprockets 48 are coupled to the rear hub assembly 30 of the rear wheel assembly 16. A front gear change mechanism 50, such as a front derailleur which may be mechanically or electrically controlled shifts the chain 46 between the plurality of front sprockets 40. A rear gear change mechanism 52, such as a rear derailleur which may be mechanically or electrically controlled shifts the chain 46 between the plurality of rear sprockets 48.

While the illustrated bicycle 10 is a road bike having drop-style handlebars 38, the present invention has applications to bicycles of any type, including fully or partially suspensioned mountain bikes and others, as well as bicycles with mechanically controlled (e.g. cable, hydraulic, pneumatic) and non-mechanical controlled (e.g. wired, wireless) drive systems. A first bicycle control device 54 and a second bicycle control device (not shown) may be mounted on the handlebars 38 to operate or control the drivetrain 18 and the front and rear disc brake assemblies 20, 22. Each of the bicycle control devices may include a shift lever assembly 58 and a brake lever assembly 60. The first bicycle control device 54 may control or operate the front derailleur 50 and the front disc brake assembly 20 while the second bicycle control device may control or operate the rear derailleur 52 and rear disc brake assembly 22. Alternatively, the shift and brake lever assemblies may be separate components mounted separately to a handlebar.

It is to be understood that the specific arrangement and illustrated components of the frame, front and rear wheel assemblies, drivetrain, front and rear disc brake assembly, seat and handlebars are nonlimiting to the disclosed embodiments. For example, the style of the handlebars may be bullhorn, flat, riser, etc. Further, various terms relating, to direction may be used herein. For example, the term "inboard" and "outboard" may be used. The terms "inboard" and "outboard" describe a position between parts or items and a vertical plane substantially bisecting the bicycle or a direction toward or away from the vertical plane substantially bisecting the bicycle. Further, the front and/or forward orientation of the bicycle 10 is indicated by the direction of arrow "A". As such, a forward direction of movement for the bicycle is indicated by the direction of arrow A.

In view of the similarities between the front and rear wheel assemblies 14, 16, only the front wheel assembly 14 will be discussed in detail below. It will be apparent to those skilled in the art from this disclosure that the description of the front wheel assembly 14 may also apply to the construction and operation of the rear wheel assembly 16, unless otherwise stated. FIGS. 2-8 illustrate an embodiment of the front wheel assembly 14A which may generally include a rim 62, the front hub assembly 26, a plurality of spokes 66 and a damper assembly 68. The rim 62 may include a radially outer portion 70, a radially inner portion 72, a first sidewall 74 and a second sidewall 76 spaced apart from the first sidewall 74. The first and second sidewalls 74, 76 extend radially inwardly of the radially outer portion 70. The radially outer portion 70 includes a surface for engaging a tire 80 (see FIG. 1) and the radially inner portion includes a surface having a plurality of openings 82 for receiving the plurality spokes 66 therethrough. The rim 62 may have a hollow interior. Further, the rim 62 may be made from a fiber reinforced plastic or aluminum. The plurality of spokes 66 extend between the rim 62 and the front hub assembly 26. The plurality of spokes 66 are maintained with a tension between the rim 62 and the hub assembly 26 to provide the front wheel assembly 14A with an operational rigidity for use on the bicycle 10. Each of the plurality of spokes 66 include a first spoke end 84 connected to the hub assembly 26, a second spoke end 86 connected to the rim 62 and a middle spoke portion 88 extending between the first and second ends 84, 86.

The front hub assembly 26 may generally include a hub axle 90, a hub body 92, first and second spoke attachment members 94, 96 and a brake rotor attachment member 110. The hub assembly 26 has a hub or central axis 91 extending through the hub axle 90 in an axial or longitudinal direction.

The hub axle 90 rotatably supports the hub body 92 by bearing assemblies (not shown) which are well known, in the bicycle art and will not be discussed or illustrated in detail herein. The hub body 92 is coaxially disposed about the hub axis 91 and includes an interior passageway 101 extending between first and second hub body ends 98, 100. The hub axle 90 is rotatably supported in the interior passageway 101. In particular, the bearing assemblies rotatably mount the hub body 92 on the hub axle 90 for freely rotating the hub body 92 in both directions about the hub axle 90. The plurality of spokes 66 include a plurality of first spokes 65 extending between the rim 62 and the first spoke attachment member 94 and a plurality of second spokes 67 extending between the rim 62 and the second spoke attachment member 96. The first and second spoke attachment members 94, 96 are disposed about the hub axle 90 and proximate the first and second hub body ends 98, 100, respectively. The first spoke attachment member 94, in this embodiment a first spoke flange, includes a first annular spoke attachment body 102 disposed about the hub axle 90 and a plurality of first spoke attachment arms 103 extending radially outwardly from the first annular spoke attachment body 102. Each of the first spoke attachment arms 103 includes at least one first spoke-receiving opening 104 for receiving one of the plurality of first spokes 65 therethrough. The plurality of first spoke attachment arms 103 may be equally spaced apart about a periphery of the first annular spoke attachment body 102.

The second spoke attachment member 96, in this embodiment a second spoke flange, includes a second annular spoke attachment body 106 disposed about the hub body 92 and a plurality of second spoke attachment arms 107 extending radially outwardly from the second annular spoke attachment body 106. Each of the second spoke attachment arms 10 includes at least one second spoke-receiving opening 108 for receiving one of the plurality of second spokes 67 therethrough. The plurality of second spoke attachment arms 107 may be equally spaced apart about a periphery of the second annular spoke attachment body 106. In this embodiment, the first and second spoke attachment members 94, 96 are formed with the hub body 92 as a one-piece, unitary member. Alternatively, the first and second spoke attachment members 94, 96 and the hub body 92 may be formed as separate members or components.

The brake rotor attachment member 110 may be disposed about the hub body 92 at the first hub body end 98 and outboard of the first spoke attachment member 94. The brake rotor attachment member 110 includes an annular body 112 having a central opening 113 and a plurality of arms 114 extending radially outwardly from the annular body 112. The plurality of arms 114 may be equally spaced apart about a periphery of the annular body 112. Each of the plurality of arms 114 includes a mounting hole 116 for receiving a fastener 118 therethrough. The disc brake rotor 34 may be mounted to the brake rotor attachment member 110 by the fasteners 118 (see FIG. 5).

The damper assembly 68 is configured to apply a first damping force, in this embodiment a first axial damping force against a spoke segment 95 of at least one spoke of the plurality of spokes 66. The spoke segment 95 extends between a first spoke segment end 83 and a second spoke segment end 81. The first spoke segment end 83 is spaced apart from the first and second spoke attachment members 94, 96. The second spoke segment end 81 is located at a position along the spoke at a first distance $D_S$ from one of the first and second attachment members 94, 96. In this embodiment, the first distance $D_S$ is equal to one-third of a second distance $D_T$ between one of the first and second spoke attachment members 94, 96 and the second spoke end 86 (see FIG. 3).

In this embodiment, the damper assembly 68 generally includes a first damper 122 disposed about the hub body 92 and inboard of the plurality of first spoke-receiving openings 104 and a second damper 124 disposed about the hub body 92 and inboard of the second spoke-receiving openings 108. The first damper 122 is also disposed inboard of the brake rotor attachment member 110 and does not contact the brake rotor 34. The first damper 122 includes a first damper ring portion 126 and a plurality of first damper arms 128 extending radially outwardly from the first annular spoke attachment body 102. Each of the first damper arms 128 extends between the first damper ring portion 126 and the first annular spoke attachment body 102. The plurality of first damper arms 128 are also disposed inboard of the first spoke-receiving openings 104 along the hub body 92 and are equally spaced about the periphery of the first annular spoke attachment body 102.

The first damper ring portion 126 may include a first recess 134 extending about a circumference of the first damper ring portion 126. The first recess 134 is defined by a first axial-extending side wall 133 located at a radius $R_1$ from the hub axis 91, a second axial-extending side wall 135 located at a radius $R_2$ from the hub axis 91 and a first base wall 137 extending between the first and second side walls 133, 135. A first damping element 13b is disposed in the first recess 134. In this embodiment, the damping element 136 is an O-ring. The O-ring may have a round, square or other geometric cross section. The first damping element 136 may be compressed or deformed against the spoke segment 95 to apply the first axial damping force $F_1$ in the generally outboard direction (see FIG. 5). The radii $R_1$ and $R_2$ may be dimensional to ensure that the first damping element 136 applies the first axial damping force $F_1$ to the spoke segment 95 within the distance $D_S$. By applying the first axial damping force $F_1$ to the spoke segment near the hub assembly, the spoke vibrations generated during disc brake actuation are dampened before they can produce noise and/or excite other bicycle components, for example through an amplification of the spoke vibrations along the length of the spokes to the rim 62.

In this embodiment, the second damper 124 includes a second damper ring portion 130 and a plurality of second damper arms 132 extending radially outwardly from the second annular spoke attachment body 106. Each of the second damper arms 132 extends between the second damper ring portion 130 and the second spoke attachment body 106. The plurality of the second damper arms 132 are also disposed inboard of the second spoke-receiving openings 108 along the hub body 92 and are equally spaced about the periphery of the second annular spoke attachment body 106. In this embodiment, the first and second dampers 122, 124, are formed with the first and second spoke attachment members 94, 96 as a one-piece, unitary member. Alternatively, the first and second dampers 122, 124 and the first and second spoke attachment members 94, 96 may be formed as separate members or components. In an embodiment, the damper assembly 68 may only include one of the first, and second dampers 122, 124.

The second damper ring portion 130 may include a second recess 138 extending about a circumference of the second damper ring portion 130. The second recess 138 is defined by a third axial-extending side wall 139 located at a radius $R_3$ from the hub axis 91, a fourth axial-extending side wall 141 located at a radius $R_4$ from the hub axis 91 and a second base wall 143 extending between the third and fourth side walls 139, 141. A second damping element 140, in this embodiment an O-ring, is disposed in the first recess 138. The O-ring may have a round, square or other geometric cross section. The second damping element 140 may be of the same, similar, or different construction, material and/or shape as the first damping element 136. For example, the second damping element 140 may be constructed of a different material than the first damping element 136, such as a material having a higher hardness value. Alternatively, the second damping element 140 may be constructed of a material having a lower hardness value than the material from which the first damping element 136 is constructed. The second damping element 140 may be compressed or deformed against the spoke segment 95 to apply a second damping force, in this embodiment a second axial damping force $F_2$ in the generally outboard direction (see FIG. 5). The radii $R_3$ and $R_4$ may be dimensioned similar to radii $R_1$ and $R_2$ to ensure that the second damping element 140 applies the second axial damping force $F_2$ to the spoke segment 95 within the distance $D_S$. Again, by applying the second axial damping force $F_2$ to the spoke segment 95 which is closer to the hub assembly than the rim, the spoke vibrations generated during disc brake actuation are dampened before they can produce noise and/or excite other bicycle components such as the hollow rim 62.

In this embodiment, the first and second damping elements 136, 140 are O-rings made from a rubber-like material. The first and second damping elements 136, 140 may be made from a harder urethane but, of course, the damping elements 136, 140 may be made of any type of material that would dampen the vibrations of the spokes 66 during disc brake actuation. Such materials may be generally compliant. For example, butadiene, butyl, other rubbers, polyethylene based materials, elastomer based materials, or compliant thermoplastics such as thermoplastic vulcanizate may be used.

Figure 14:
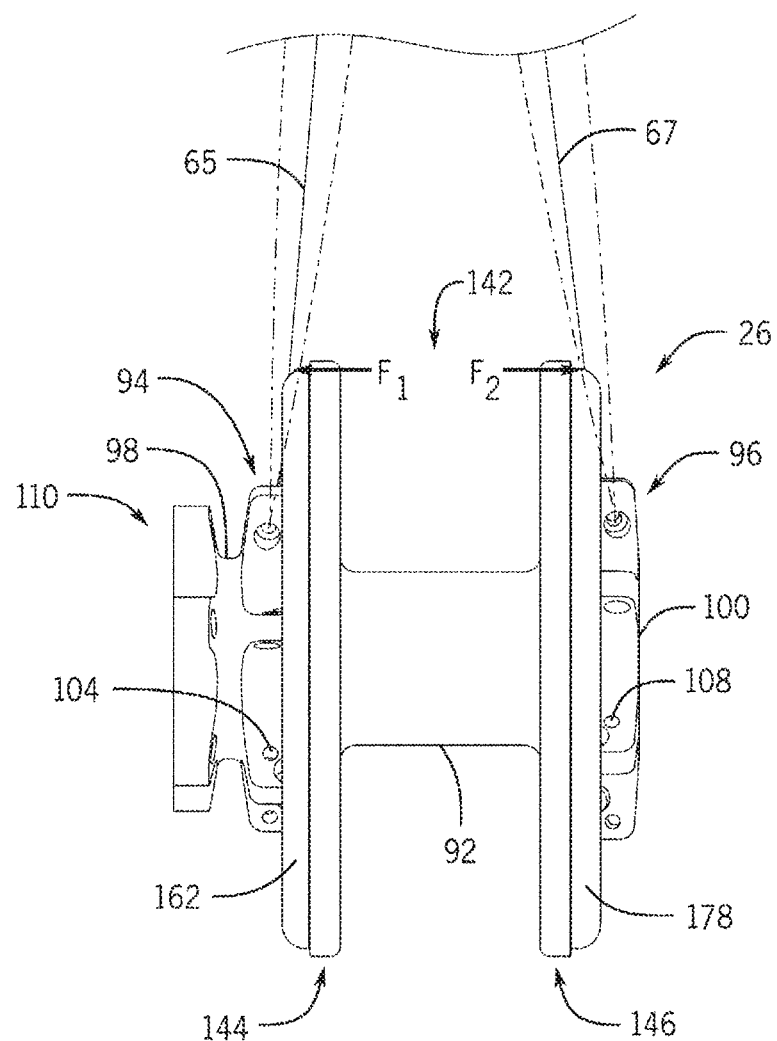
FIG. 14 is an end view of the hub assembly of the wheel assembly of FIG. 9 showing the axial vibration of two spokes.
Figure 15:
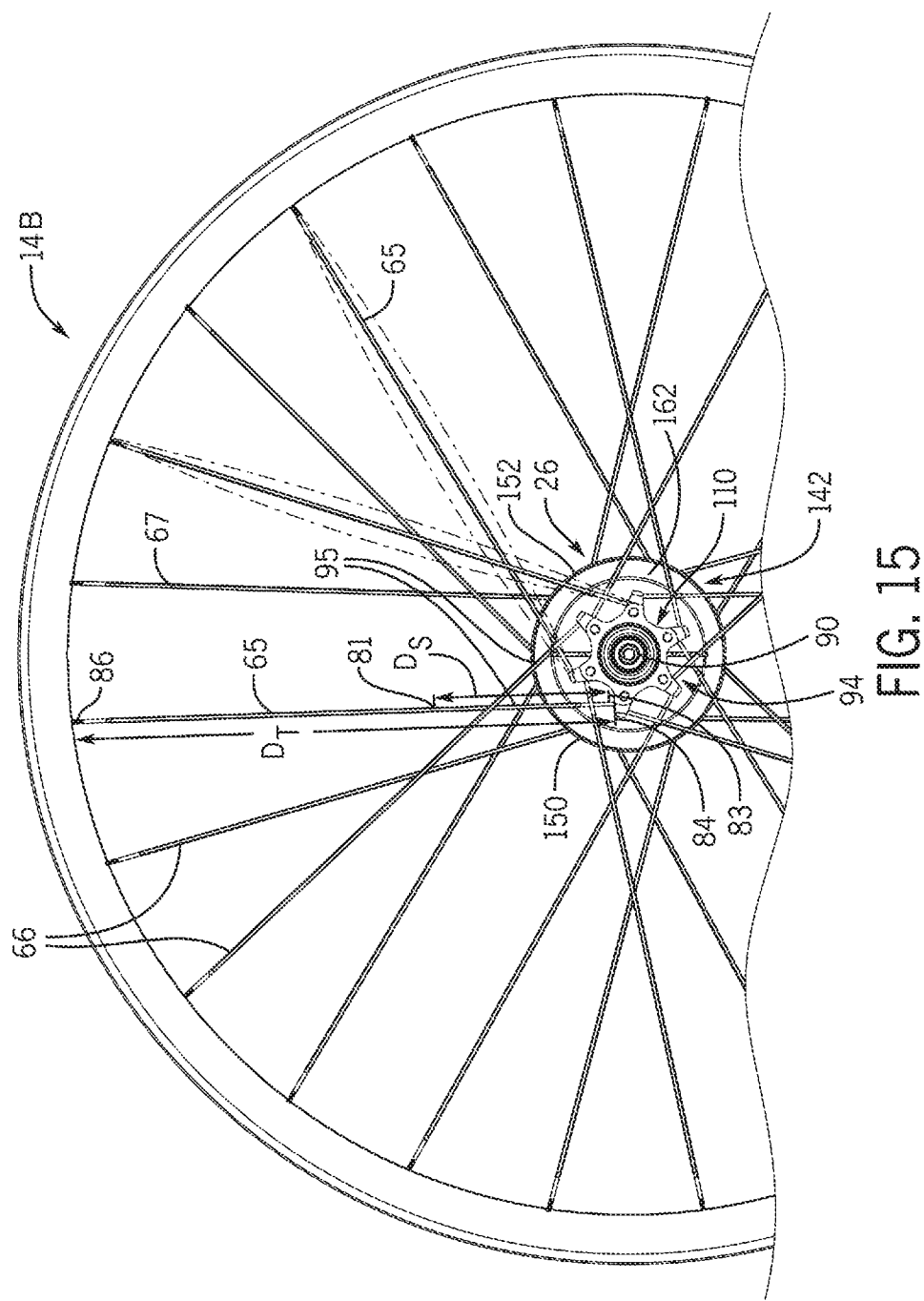
FIG. 15 is an enlarged detail side view of the wheel assembly of FIG. 9 showing tangential vibrations of two spokes.

In this embodiment, the first damping element 136 applies the first damping force $F_1$ against every first spoke 65 and the second damping element 140 applies the second damping force $F_2$ against every second spoke 67. Alternatively, the damping elements 136, 140 may apply the first and second damping force $F_1$, $F_2$ to less than all of the plurality of spokes such as every other spoke or to any other pattern of spokes to dampen the vibrations of the spokes. Further, by applying the first and second damping forces $F_1$, $F_2$ in the axial direction on both sides of the wheel assembly, spoke movement is reduced in the axial and/or tangential directions. The first and second damping forces $F_1$, $F_2$ may be equal or unequal and may be applied in various directions such as axial and/or tangential. FIG. 14 shows the spokes 65, 67 vibrating in an axial direction and FIG. 15 shows the spokes 65 vibrating in a tangential direction. Alternatively, the first axial damping force $F_1$ may be applied to the spokes of only one side of the wheel assembly to dampen the spoke vibrations, such as the side of the wheel having the brake rotor 34.

FIGS. 9-15, illustrate another embodiment of a damper assembly 142 mounted to the front wheel assembly 14B which is similar to the damper assembly 68 shown in FIGS. 2-8 except the damper assembly 142 is removably mounted about the hub body 92 of the front hub assembly 26 as a separate member or component. The damper assembly 142 is configured to apply a first damping force, in this embodiment a first axial damping force $F_1$, against the spoke segment 95 of the at least one spoke of the plurality of spokes 66. The spoke segment 95 extends between the first spoke segment end 83 and the second spoke segment end 81. The first spoke segment end is spaced apart, from the first and second spoke attachment members 94, 96. The second spoke segment 81 is located at a position along the spoke at the first distance $D_S$ from one of the first and second spoke attachment members 94, 96. In this embodiment, the first distance $D_S$ is equal to one-third of a second distance $D_T$ between one of the first and second spoke attachments 94, 96 and the second spoke end 86 (see FIG. 15). In this embodiment, the damper assembly 142 generally includes first and second dampers 144, 146. The first damper 144 is disposed inboard, of the first spoke attachment member 94 along the hub body 92. The first damper 144 is also disposed inboard of the brake rotor-attachment member 110 and does not contact the brake rotor 34. In this embodiment, the first damper 144 forms a disc-shaped body having a central opening 148 for receiving the hub body 92 therethrough. The first damper 144 includes a first damper portion 150 and a second damper portion 152 mounted about the hub body 92 inboard of the first spoke-receiving openings 104 and fastened together by a plurality of first fasteners 154. The first damper portion 150 includes a plurality of first holes 156 for receiving the plurality of first fasteners 154 therethrough. The second damper portion 152 includes a plurality of second holes 158 configured to be aligned with the plurality of first holes 156 such that the plurality of first fasteners 154 may extend through both of the first and second damper portions 150, 152 when the first and second portions 150, 152 are mounted about the hub body 92.

The first and second damper portions 150, 152 include first and second recesses 160, 161, respectively, for receiving a first damping element 162 therein. When the first and second damper portions 150, 152 are mounted about the hub body 92, the first and second recesses 160, 161 are aligned to form one continuous recess for receiving the first damping element 162, in this embodiment an O-ring. The O-ring may have a round, square or other geometric cross section. Each of the first and second recesses 160, 161 are defined by a first axial-extending side wall 155 located at a radius $R_1$ from the hub axis 91, a second axial-extending side wall 157 located at a radius $R_2$ from the hub axis 91 and a first base wall 159 extending between the first and second side walls 155, 157. The first damping element 162 may be compressed or deformed against the spoke segment 95 to apply the first axial damping force $F_1$ in generally the outboard direction (see FIG. 14). The radii $R_1$ and $R_2$ may be dimensioned to ensure that the first damping element 162 applies the first axial damping force $F_1$ to the spoke segment 95. The damping element 162 applies the first, axial damping force $F_1$ against the spoke segments 95 in the outboard direction to dampen the vibrations of the spokes, which may result in the vibrations of other bicycle components being dampened and/or prevented.

The second damper 146 includes a third damper portion 164 and a fourth damper portion 166 mounted about the hub body 92 inboard of the second spoke-receiving openings 108 and fastened together plurality of second fasteners 168. The third damper portion 164 includes a plurality of third holes 170 for receiving the plurality of second fasteners 168 therethrough. The fourth damper portion 166 includes a plurality of fourth holes 172 configured to be aligned with the plurality of third holes 170 such that the plurality of second fasteners 168 may extend through both of the third and fourth damper portions 164, 166 when the third and fourth portions 164, 166 are mounted about the hub body 92.

The third and fourth damper portions 164, 166 include third and fourth recesses 174, 176, respectively, for receiving a second damping element 178 therein. When the third and fourth damper portions 164, 166 are mounted about the hub body 92, the third and fourth recesses 174, 176 are aligned to form one continuous recess for receiving the second damping element 178, in this embodiment an O-ring. The O-ring may have a round, square or other geometric cross section. Each of the third and fourth recesses 174, 176 are defined by a third axial-extending side wall 173, a fourth axial-extending side wall 175 and a second base wall 177 extending between the third and fourth side walls 173, 175. Similar to the first and second recesses 160, 161 of the first and second damper portions 144, 146, respectively, the third and fourth recesses 174, 176 may be dimensioned to ensure that the second damping element 178 applies a second damping force, in this embodiment a second axial damping force $F_2$, to the spoke segments 95. The second damping element 178 may be compressed or deformed against the spoke segments 95 to apply the second axial damping force $F_2$ in the generally outboard direction to dampen the vibrations of the spokes, which may result in the vibrations of other bicycle components being dampened and/or prevented. Alternatively, the first and second dampers 144, 146 may be divided into more than two portions. Each of the first and second dampers 144, 146 are mounted about the hub body 92 by placing their respective damper portions 150, 152, 164, 166 around the hub body 92 and then placing the fasteners 154, 168 through the holes 156, 158, 170, 172 in the damper portions 150, 152, 164, 166. The first and second fasteners 154, 168 may be bolts or other fastening means.

In this embodiment, the first and second damping elements 162, 178 are O-rings made from a rubber-like material. The first and second damping elements 162, 178 may be made from a harder urethane but, of course, the damping elements 162, 178 may be made of any type of material that would dampen the vibrations of the spokes 66 during disc brake actuation, for example, the materials listed above with respect, to the first and second dampers 136, 140 of the embodiment shown in FIGS. 2-8 may be used.

In this embodiment, the first damping element 162 applies the first axial damping force $F_1$ against every first spoke 65 and the second damping element 178 applies the second axial damping force $F_2$ against every second spoke 67. Alternatively, the first and second damping elements 162, 178 may apply the first and second damping forces $F_1$, $F_2$ to less than all of the plurality of spokes such as every other spoke or to any other pattern of spokes to dampen the vibrations of the spokes. Further, by applying the first and second damping forces $F_1$, $F_2$ in the axial direction on both sides of the wheel assembly, spoke movement is reduced in the axial and/or tangential directions. The first and second damping forces $F_1$, $F_2$ may be equal, or unequal and may be applied in various directions such as axial and/or tangential. Alternatively, the first damping force $F_1$ may be applied to only one side of the wheel assembly to dampen the spoke vibrations.

Figure 16:
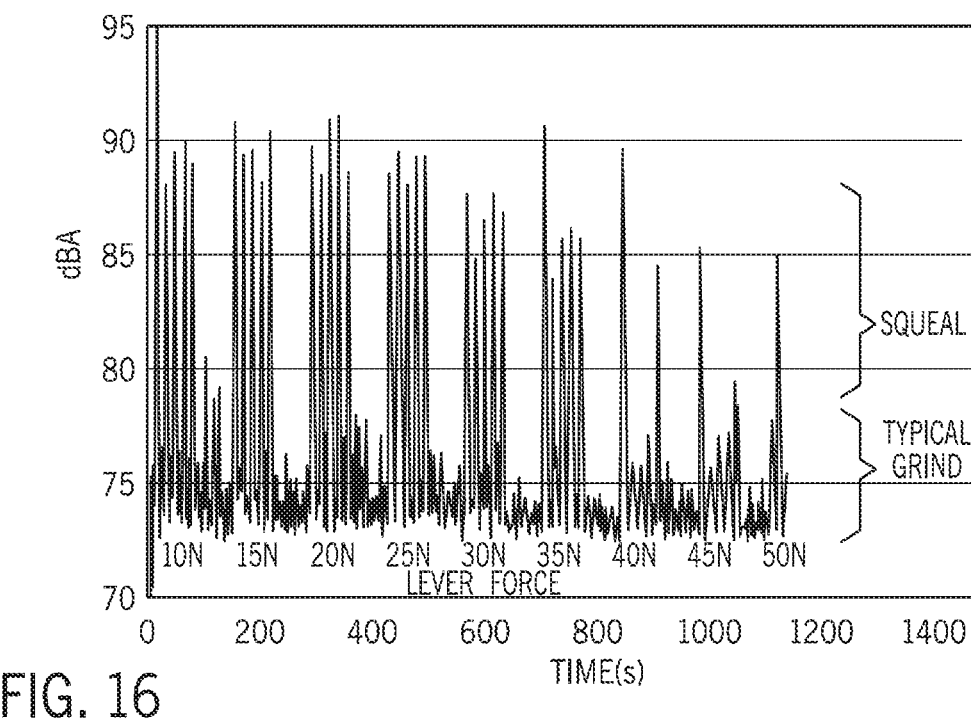
FIG. 16 is a graph illustrating the sound levels of a conventional wheel assembly without a damper assembly during disc brake actuation under wet conditions.
Figure 17:
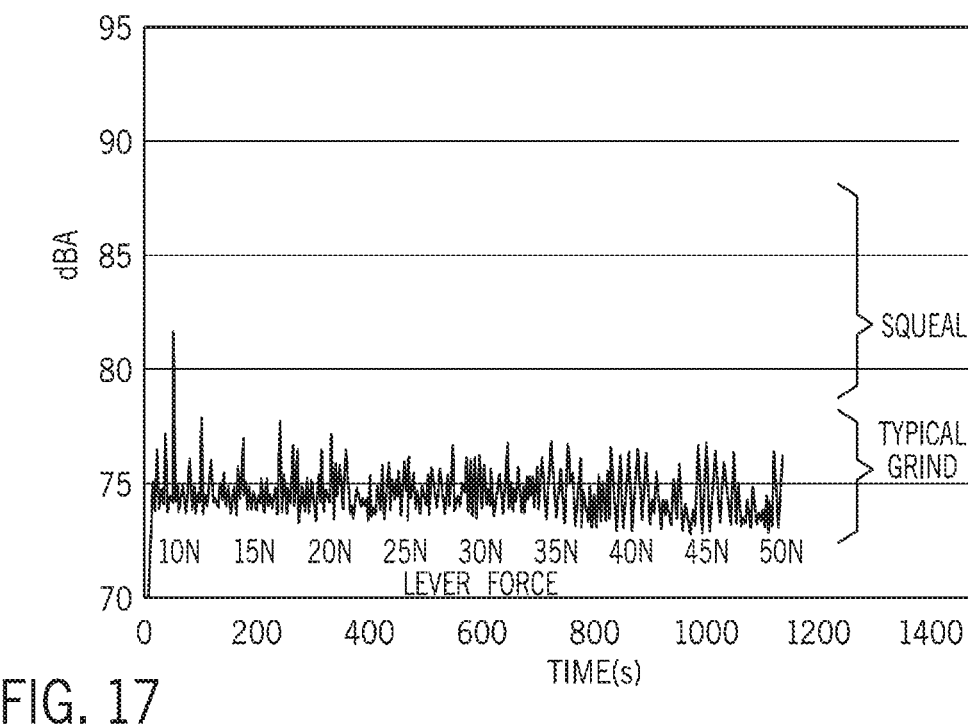
FIG. 17 is a graph illustrating the sound levels of the wheel assembly with the damper assembly of FIG. 9 during disc brake actuation under wet conditions.
Figure 18:
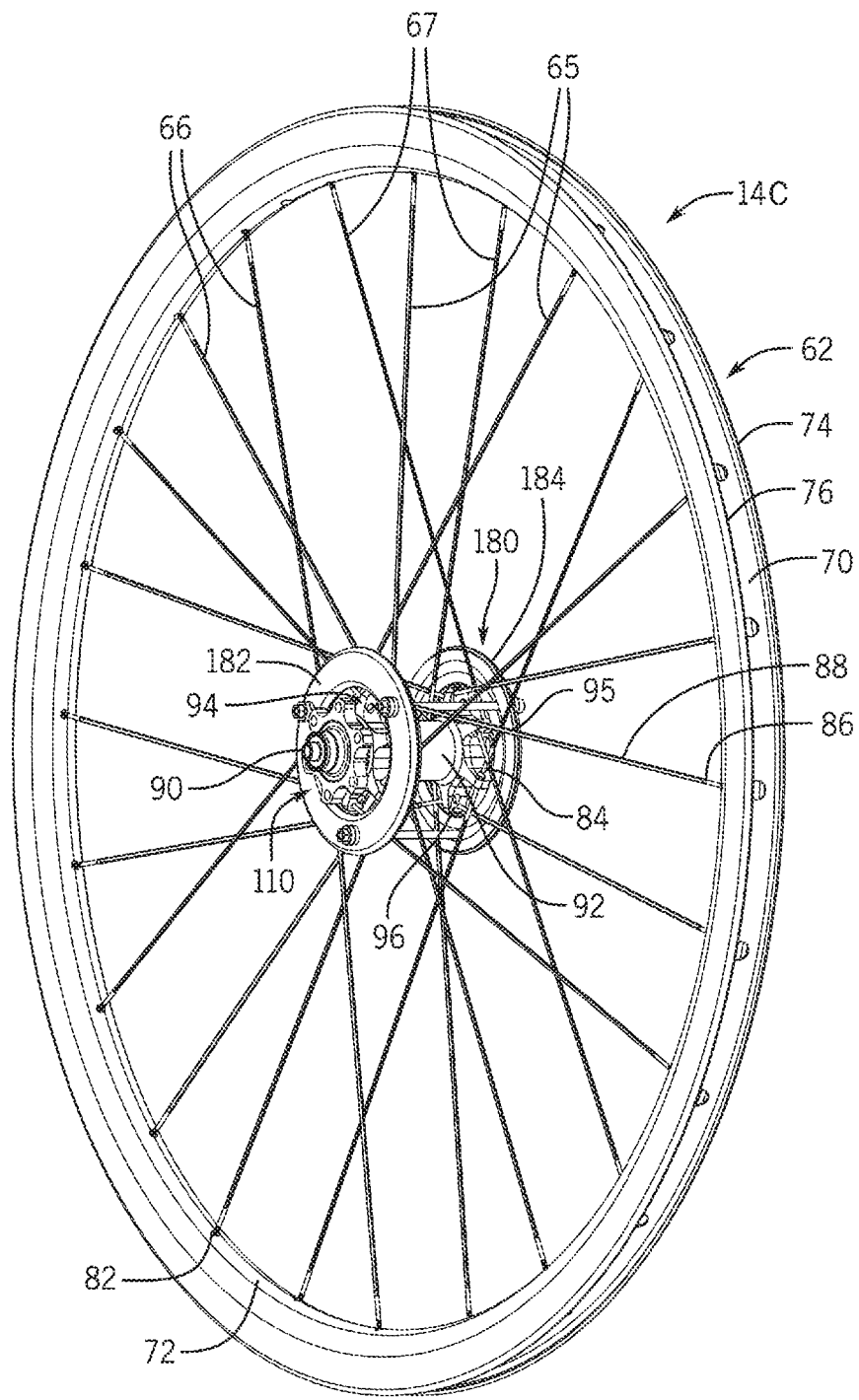
FIG. 18 is a perspective side view of the wheel assembly incorporating another embodiment of a damper assembly.
Figure 20:
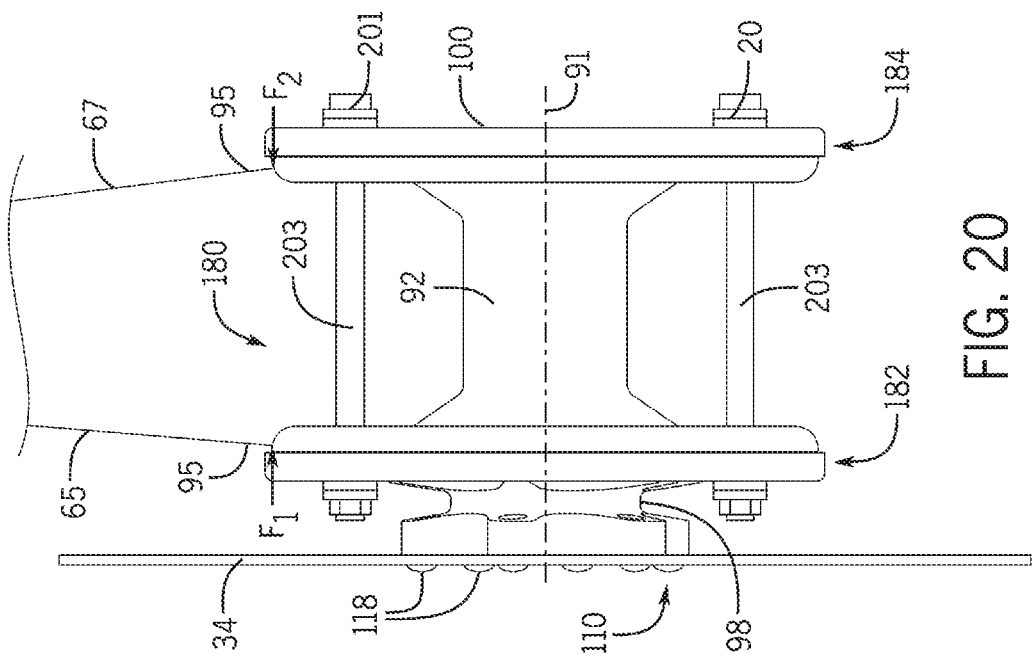
FIG. 20 is an end view of the hub assembly of the wheel assembly of FIG. 18, wherein only two spokes are attached to the hub assembly and a disc rotor is attached to the brake rotor attachment member.
Figure 19:
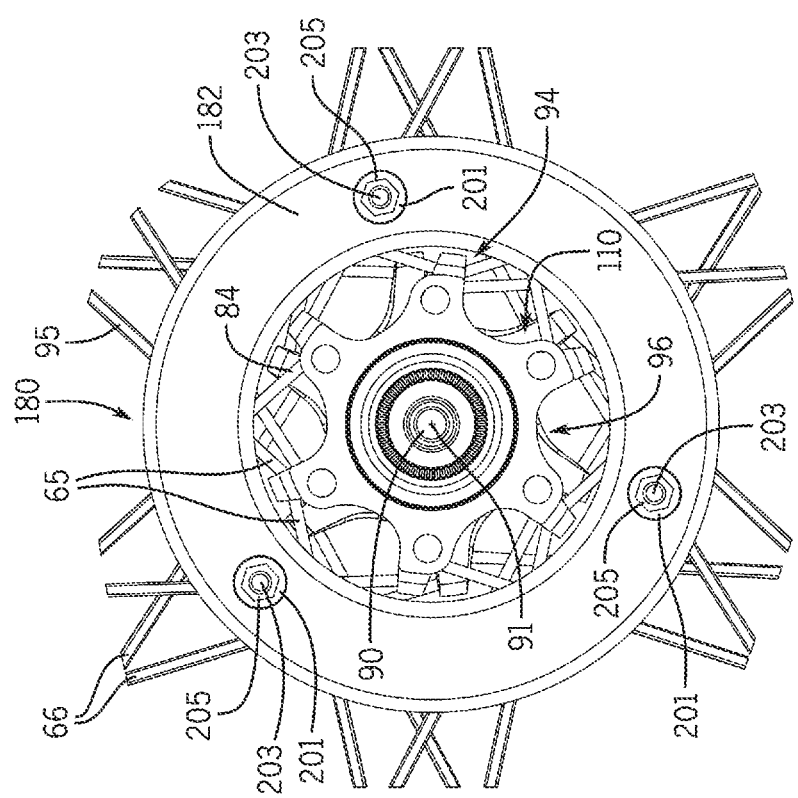
FIG. 19 is an enlarged detail side view of the hub assembly of the wheel assembly of FIG. 18.
Figure 21:
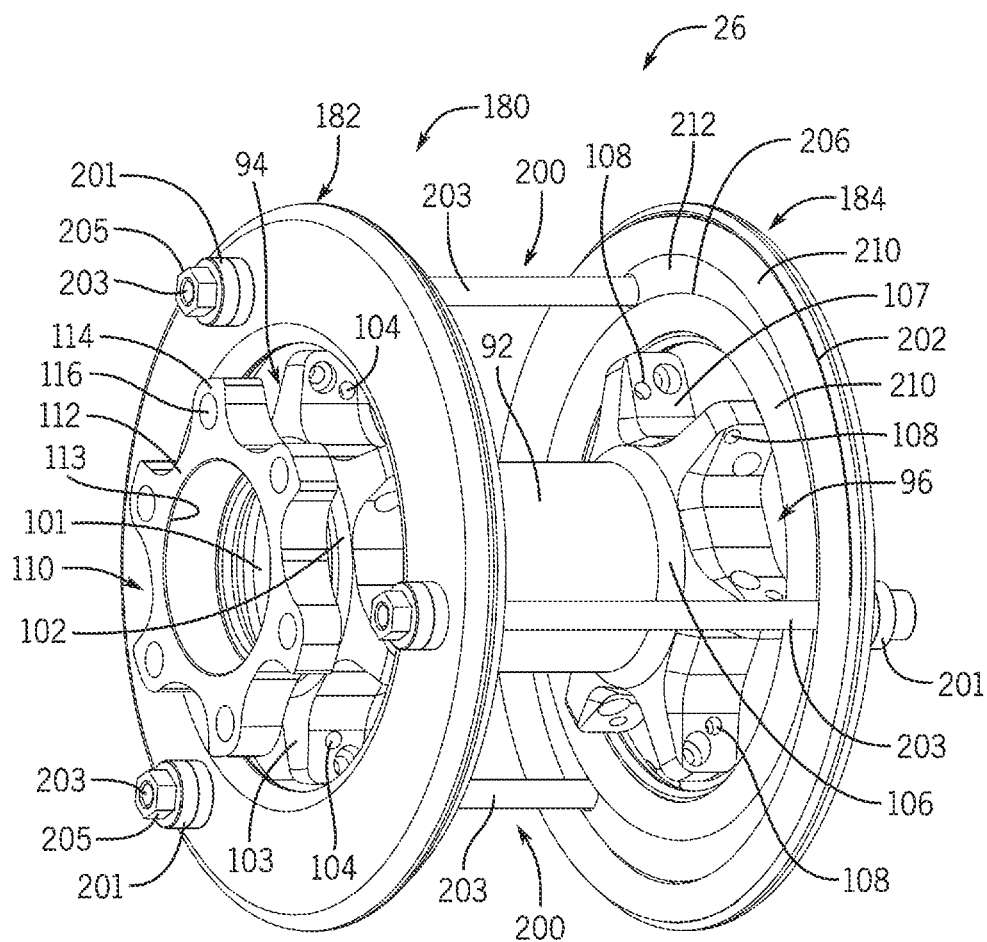
FIG. 21 is a perspective first side view of the hub assembly of the wheel assembly of FIG. 18.
Figure 22:
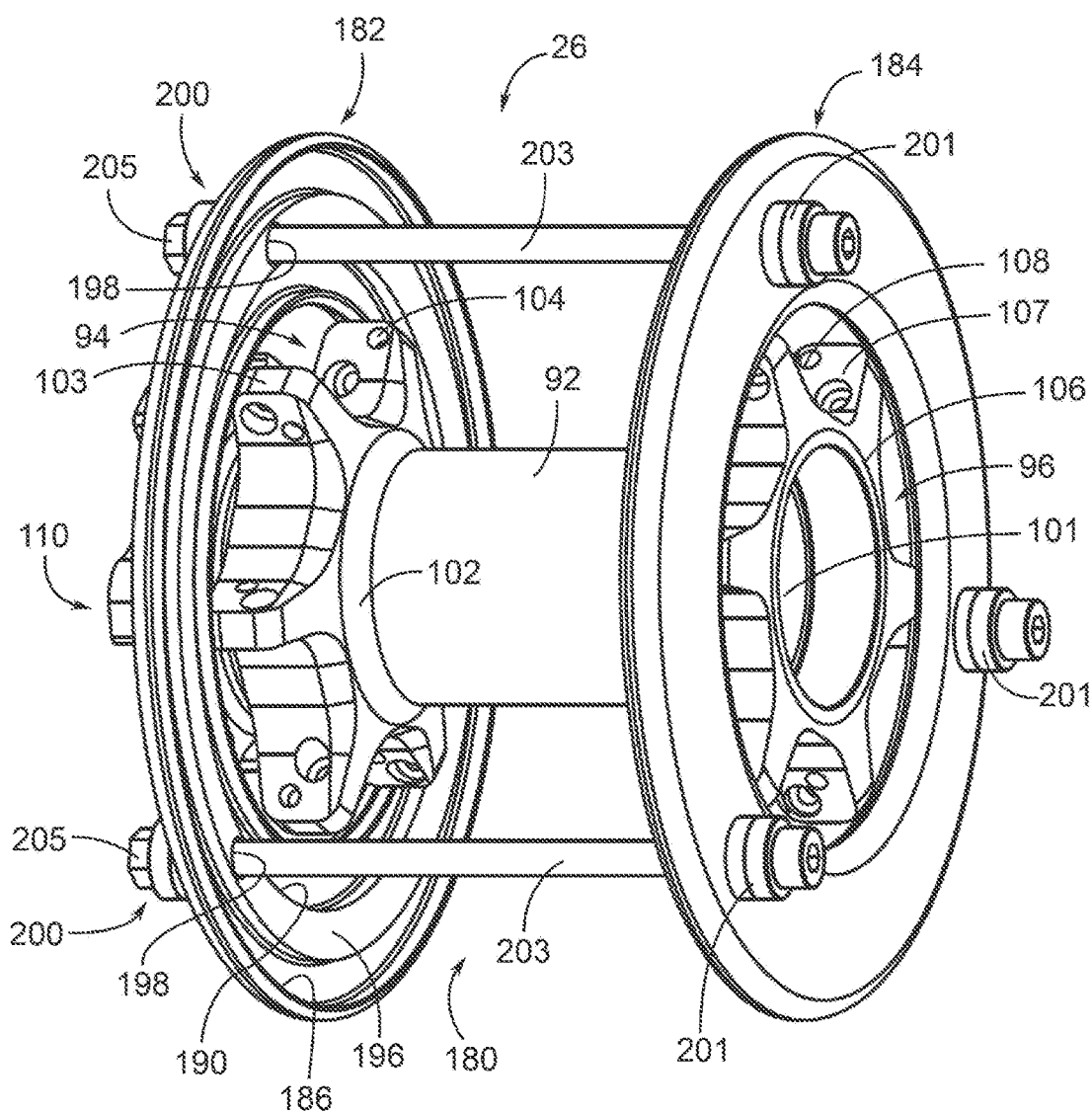
FIG. 22 is a perspective second side view of the hub assembly of the wheel assembly of FIG. 18.
Figure 23:
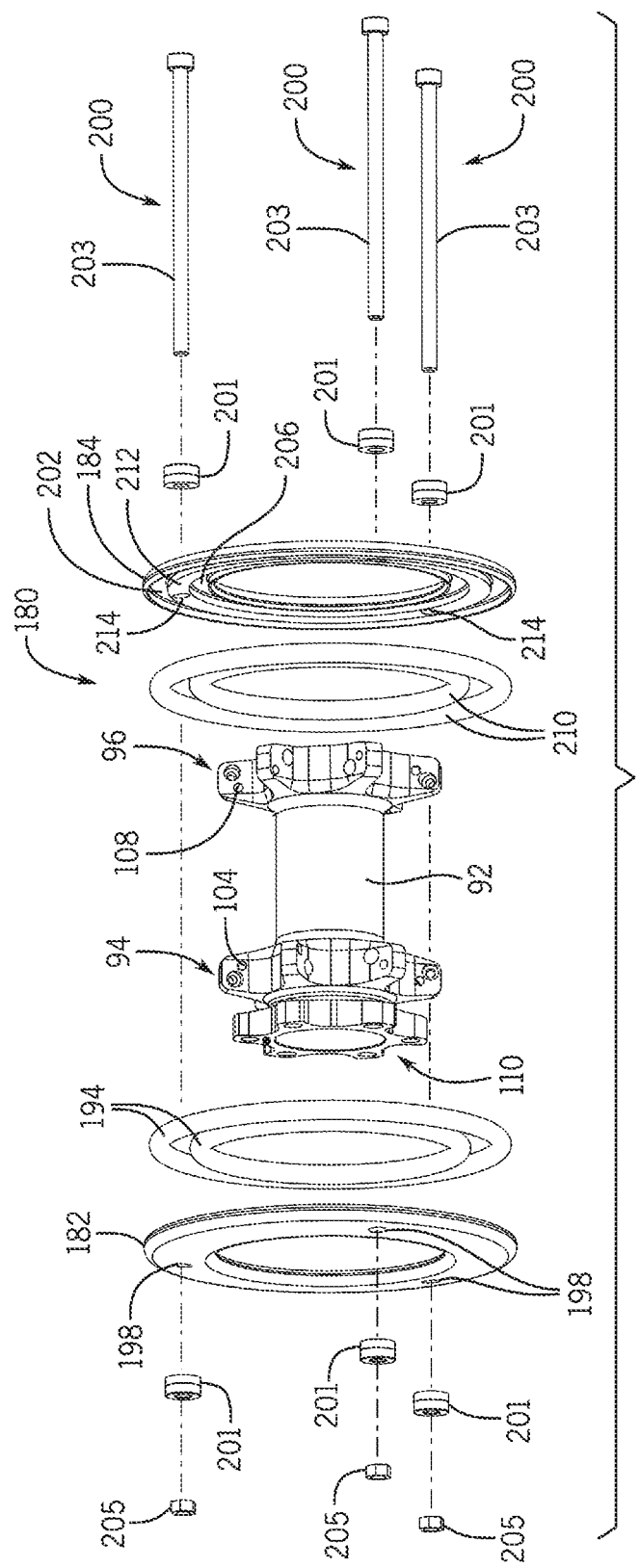
FIG. 23 is a partial exploded view of the hub assembly of wheel assembly of FIG. 18.

FIG. 16 is a graph of a disc brake performance test illustrating the sound levels of a conventional wheel assembly without a damper assembly during brake actuation under simulated wet conditions. FIG. 1 is a graph of a disc brake performance test illustrating the sound levels of the wheel assembly 14B with the damper assembly 142 during disc brake actuation under simulated wet conditions. During both performance tests, the brake lever forces were incrementally increased over time under simulated wet conditions. Both graphs show the sound level in dBA versus time in seconds. The performance tests show that the conventional wheel assembly generated sound regularly over 80 dBA, or squeal noise, during disc brake actuation while the wheel assembly incorporating the damper assembly did not regularly generate noise over 80 dBA during disc brake actuation but generated only the typical grinding noise.

FIGS. 18-23, illustrate another embodiment of a damper assembly 180 mounted to the front wheel assembly 14C which is similar to the damper assembly 68 shown in FIGS. 2-8 and the damper assembly 142 shown in FIGS. 9-15 except that the damper assembly 180 is removably mounted to the plurality of spokes 66 of the front wheel assembly 14C as a separate component. In this embodiment, the damper assembly 180 may be disposed about the hub body 92, but does not contact the hub body 92. The damper assembly 180 is configured to apply a first damping force, in this embodiment a first axial damping force $F_1$, against the spoke segment 95 of at least one spoke of the plurality of spokes 66 (see FIG. 20). The damper assembly 180 generally includes first and second dampers 182, 184. The first damper 182 is disposed outboard of the first spoke-receiving openings 104. The first damper 182 is also disposed inboard of the brake rotor attachment member 110 along the hub axle 90 and does not contact the brake rotor 34. In this embodiment, the first damper 182 forms an annulus or ring-shaped body. The first damper 182 may include a first outer recess 186 extending about an outer circumference of the first damper 182 and a first inner recess 190 extending about an inner circumference of the first damper 182. Each of the outer and inner recesses 186, 190 are configured to receive corresponding first damping elements 194 therein. The first damping elements 194 apply first damping forces, in this embodiment first axial damping forces $F_1$ against the spoke segments 95 of the plurality of first spokes 65 in the generally inboard direction (see FIG. 20). In this embodiment, the first damping elements are O-rings that may have a round, square or other geometric cross section. A first mounting portion 196 is disposed between the outer and inner recesses 186, 190. The first mounting portion 196 includes a plurality of first fastener holes 198 configured to receive a plurality of fasteners 200 therethrough. The first outer recess 186 and first inner recess 190 may be dimensioned to ensure that the first damping elements 194 apply the first axial damping force $F_1$ to the spoke segments 95.

In this embodiment, the second damper 184 is disposed outboard of the second spoke-receiving openings 108 and forms an annulus or ring-shaped body. The second damper 184 may include a second outer recess 202 extending around an outer circumference of the second damper 184 and a second inner recess 206 extending around an inner circumference of the second damper 184. Each of the outer and inner recesses 202, 206 are configured to receive corresponding second damping elements 210 therein. The second damping elements 210 apply second damping forces, in this embodiment second axial damping forces $F_2$ against the spoke segments 95 of the plurality of second spokes 67 in the generally inboard direction (see FIG. 20). A second mounting portion 212 is disposed between the outer and inner recesses 202, 206. The second mounting portion 212 includes a plurality of second fastener holes 214 configured to be aligned with the plurality of first fastener holes 198 when the first and second dampers 182, 184 are mounted to the spokes 66 such that each fastener 200 may extend through both of the first and second fastener holes 198, 214 of the first and second dampers 182, 184. The fasteners 200 may include washers 201, nuts 205, and bolts 203 dimensioned to extend through both of the first and second fastener holes to secure the first and second dampers 182, 184 to the spokes 66. Similar to the first and second recesses 186, 190 of the first damper 182, the third and fourth recesses 202, 206 may be dimensioned to ensure that the second damping elements 210 apply the second axial damping force $F_2$ to the spoke segments 95.

In this embodiment, the first and second damping elements 194, 210 are O-rings made from a rubber-like material. The first and second damping elements 194, 210 may be made from a harder urethane but, of course, the first and second damping elements 194, 210 may be made of any type of material that would dampen the vibrations of the spokes 66 during disc brake actuations such as soft rubber or materials as indicated above.

In this embodiment, the first damping elements 194 apply the first axial damping forces $F_1$ against every first spoke 65 and the second damping elements 210 apply the second axial damping forces $F_2$ against every second spoke 67. Alternatively, the first and second damping elements 194, 210 may apply the damping forces $F_1$, $F_2$ to less than all of the plurality of spokes such as every other spoke or to any other pattern of spokes to dampen the vibrations of the spokes. Further, by applying the first and second damping forces $F_1$, $F_2$ in the axial direction on both sides of the wheel assembly, spoke movement is reduced in the axial and/or tangential directions. The first and second damping forces $F_1$, $F_2$ may be equal or unequal and applied in various directions such as axial and/or tangential.

A bicycle wheel assembly comprises a rim, a hub assembly, a plurality of spokes and a damper assembly. The hub assembly comprises a hub body disposed about a hub axis and rotatable with respect to the hub axis. The hub body includes a first hub body end and a second hub body end spaced apart from the first hub body end along the hub axis. The hub assembly also comprises first and second spoke attachment members disposed about the hub axis and proximate the first and second hub body ends, respectively. The first spoke attachment member includes a plurality of first spoke-receiving openings and the second spoke attachment member includes a plurality of second spoke-receiving openings. The plurality of spokes comprises a plurality of first spokes extending between the rim and the first spoke attachment member and a plurality of second spokes extending between the rim and the second spoke attachment member. The damper assembly comprises a first damper applying a first axial damping force against at least one first spoke of the plurality of first spokes, and a second damper applying a second axial damping force against at least one second spoke of the plurality of second spokes.

In an embodiment, the first damper is disposed about the hub axis and inboard of the first spoke-receiving openings and applies the first axial damping force in a generally outboard direction. The second damper is disposed about the hub axis and inboard of the second spoke-receiving openings and applies the second axial damping force in a generally outboard direction.

In an embodiment, the first damper is disposed about the hub axis and outboard of the first spoke-receiving openings and applies the first axial damping force in a generally inboard direction. The second damper is disposed about the hub axis and outboard of the second spoke-receiving openings and applies the second axial damping force in a generally inboard direction.

In an embodiment, the first and second dampers may be supported on the hub assembly. In an embodiment, the first and second dampers may be removably mounted about the hub assembly. In an embodiment, the first and second dampers may be formed with the hub assembly as a one-piece, unitary member. In an embodiment, the first and second dampers are supported on the plurality of spokes. In an embodiment, the first and second dampers may be removably mounted to the plurality of spokes.

In an embodiment, the first damper may include a first clamping element made of a deformable material. The first damping element may compress against the at least one first spoke to apply the first axial damping force. Further, the second damper may include a second damping element made of a deformable material. The second damping element may compress against the at least one second spoke to apply the second axial damping force.

In an embodiment, the first damper may apply the first axial damping force to all the plurality of first spokes and the second damper applies the second axial damping force to all the plurality of second spokes. In an embodiment, the first damper may apply the first axial damping force to every other first spoke of the plurality of first spokes and the second damper may apply the second axial damping force to every other second spoke of the plurality of second spokes.

In an embodiment, the hub assembly comprises a brake rotor attachment member disposed about the hub axis and outboard of the first damper along the hub axis. In an embodiment, the rim is made from a fiber reinforced plastic.

A bicycle wheel assembly comprises a rim, a hub assembly, a plurality of spokes and a damper assembly. The hub assembly comprises a hub body disposed about a hub axis and rotatable with respect to the hub axis. The hub body includes a first hub body end and a second hub body end spaced apart from the first hub body end along the hub axis. The hub assembly further comprises first and second spoke attachment members disposed about the hub axis and proximate the first and second hub body ends, respectively. The first spoke attachment member includes a plurality of first spoke-receiving openings and the second spoke attachment member includes a plurality of second spoke-receiving openings. Each spoke of the plurality of spokes have first and second spoke ends. The first spoke end is attached to one of the first and second spoke attachment members and the second spoke end is attached to the rim. The damper assembly comprises a first damping element applying a first damping force against at least one spoke segment of at least one spoke of the plurality of spokes. The spoke segment extends between a first spoke segment end and a second spoke segment end. The first spoke segment end is spaced apart from one of the first and second spoke attachment members. The second spoke segment end is located at a first distance from one of the first and second spoke attachment members. The first distance is equal to one-third of a second distance between one of the first and second spoke attachment members and the second spoke end.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifies, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following, claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle wheel assembly comprising:
   a rim;
   a hub assembly comprising:
      a hub body disposed about a hub axis and rotatable with respect to the hub axis, the hub body including a first hub body end and a second hub body end spaced apart from the first hub body end along the hub axis, and
      first and second spoke attachment members disposed about the hub axis and proximate the first and second hub body ends, respectively, the first spoke attachment member including a plurality of first spoke-receiving openings, the second spoke attachment member including a plurality of second spoke-receiving openings;
   a plurality of spokes comprising a plurality of first spokes extending between the rim and the first spoke attachment member and a plurality of second spokes extending between the rim and the second spoke attachment member; and
   a damper assembly contacting the hub assembly and comprising a first damper applying a first axial damping force against at least one first spoke of the plurality of first spokes, and a second damper applying a second axial damping force against at least one second spoke of the plurality of second spokes.

2. The bicycle wheel assembly of claim 1, wherein the first damper is disposed about the hub axis and inboard of the first spoke-receiving openings and applies the first axial damping force in a generally outboard direction, the second damper disposed about the hub axis and inboard of the second spoke-receiving openings and applying the second axial damping force in a generally outboard direction.

3. The bicycle wheel assembly of claim 1, wherein the first damper is disposed about the hub axis and outboard of the first spoke-receiving openings and applies the first axial damping force in a generally inboard direction, the second damper disposed about the hub axis and outboard of the second spoke-receiving openings and applying the second axial damping force in a generally inboard direction.

4. The bicycle wheel assembly of claim 1, wherein the first and second dampers are supported on the hub assembly.

5. The bicycle wheel assembly of claim 4, wherein the first and second dampers are removably mounted about the hub assembly.

6. The bicycle wheel assembly of claim 4, wherein at least a portion of the first and second dampers are formed with the hub assembly as a one-piece, unitary member.

7. The bicycle wheel assembly of claim 1, wherein the first damper includes a first damping element made of a deformable material, the first damping element compressing against the at least one first spoke to apply the first axial damping force, the second damper including a second damping element made of a deformable material, the second damping element compressing against the at least one second spoke to apply the second axial damping force.

8. The bicycle wheel assembly of claim 1, wherein the first damper applies the first axial damping force to all the plurality of first spokes and the second damper applies the second axial damping force to all the plurality of second spokes.

9. The bicycle wheel assembly of claim 1, wherein the first damper applies the first axial damping force to every other first spoke of the plurality of first spokes and the second damper applies the second axial damping force to every other second spoke of the plurality of second spokes.

10. The bicycle wheel assembly of claim 1, wherein the hub assembly comprises a brake rotor attachment member disposed about the hub axis and outboard of the first damper along the hub axis.

11. The bicycle wheel assembly of claim 1, wherein the rim is made from a fiber reinforced plastic.

12. A hub assembly for a bicycle wheel assembly comprising:
   a hub axle;
   a hub body coaxially disposed about the hub axle and rotatable with respect to the hub axle, the hub body including a first hub body end and a second hub body end spaced apart from the first hub body end along the hub axle;

first and second spoke attachment members disposed about the hub axle and proximate the first and second hub body ends, respectively, the first spoke attachment member including a plurality of first spoke-receiving openings, the second spoke attachment member including a plurality of second spoke-receiving openings;

a brake rotor attachment member disposed outboard of the first spoke attachment member along the hub axle; and a damper assembly in contact with the hub body and comprising a first damper configured to apply a first damping force against at least one first spoke extending from the plurality of first spoke-receiving openings, and a second damper configured to apply a second damping force against at least one second spoke extending from the plurality of second spoke-receiving openings, the first damper disposed inboard of the brake rotor attachment member along the hub axle.

13. The hub assembly of claim 12, wherein the first damper is disposed about the hub body and inboard of the first spoke-receiving openings and the second damper is disposed inboard of the second spoke-receiving openings, the first damper configured to apply a first axial damping force against the plurality of spokes extending from the first spoke-receiving openings in the generally outboard direction, the second damper configured to apply a second axial damping force against the plurality of spokes extending from the second spoke-receiving openings in the generally outboard direction.

14. The hub assembly of claim 12, wherein the first damper is disposed about the hub body and outboard of the first spoke-receiving openings and the second damper is disposed about the hub body and outboard of the second spoke-receiving openings, the first damper configured to apply a first axial damping force against the plurality of spokes extending from the first spoke-receiving openings in the generally inboard direction, the second damper configured to apply a second axial damping force against the plurality of spokes extending from the second spoke-receiving openings in the generally inboard direction.

15. The hub assembly of claim 12, wherein the first and second dampers are supported on one of the first and second spoke attachment members.

16. The hub assembly of claim 15, wherein the first and second dampers are removably mounted about the hub body.

17. The hub assembly of claim 12, wherein the first damper includes a first damping element made of a deformable material, the first damping element compressing against the at least one first spoke to apply the first damping force, the second damper including a second damping element made of a deformable material, the second damping element compressing against the at least one second spoke to apply the second damping force.

18. The hub assembly of claim 12, wherein the first damper applies the first axial damping force to all the plurality of first spokes and the second damper applies the second axial damping force to all the plurality of second spokes.

19. The hub assembly of claim 12, wherein the first damper applies the first axial force to every other first spoke of the plurality of first spokes and the second damper applies the second axial force to every other second spoke of the plurality of second spokes.

20. A bicycle wheel assembly comprising:
a rim;
a hub assembly comprising:
a hub body disposed about a hub axis and rotatable with respect to the hub axis, the hub body including a first hub body end and a second hub body end spaced apart from the first hub body end along the hub axis, and first and second spoke attachment members disposed about the hub axis and proximate the first and second hub body ends, respectively, the first spoke attachment member including a plurality of first spoke-receiving openings, the second spoke attachment member including a plurality of second spoke-receiving openings;

a plurality of spokes, each spoke of the plurality of spokes having first and second spoke ends, the first spoke end attached to one of the first and second spoke attachment members, the second spoke end attached to the rim; and a damper assembly comprising a first damping element applying a first damping force against at least one spoke segment of at least one spoke of the plurality of spokes, the spoke segment extending between a first spoke segment end and a second spoke segment end, the first spoke segment end spaced apart from one of the first and second spoke attachment members, the second spoke segment end located at a first distance from one of the first and second spoke attachment members, the first distance equal to one-third of a second distance between one of the first and second spoke attachment members and the second spoke end, wherein at least a portion of the damper assembly is formed with the hub assembly as a one-piece, unitary member.

21. The bicycle wheel assembly of claim 20, wherein the damper assembly is disposed inboard of one of the first and second spoke-receiving openings, the first damping element applying a first axial damping force in a generally outboard direction.

22. The bicycle wheel assembly of claim 21, wherein the plurality of spokes comprises:
a plurality of first spokes extending between rim and the first spoke attachment member, and
a plurality of second spokes extending between rim and the second spoke attachment member,
the damper assembly comprising:
a first damper disposed about the hub axis and inboard of the first spoke-receiving openings, the first damper comprising the first damping element applying the first axial damping force against the spoke segment of at least one first spoke of the plurality of first spokes in the generally outboard direction, and
a second damper disposed about the hub axis and inboard of the second spoke-receiving openings, the second damper comprising a second damping element applying a second axial damping force against the spoke segment of at least one second spoke of the plurality of second spokes in the generally outboard direction.

23. The bicycle wheel assembly of claim 20, wherein the damper assembly is supported on the hub assembly.

24. The bicycle wheel assembly of claim 23, wherein the first and second damper assemblies comprise damping elements formed of a compliant material.

25. The bicycle wheel assembly of claim 20, wherein the first damping element is made of a deformable material, the first damping element compressing against the spoke segment of the at least one spoke to apply a first axial damping force.

26. The bicycle wheel assembly of claim 20, wherein the first damping element applies the first damping force to all the spoke segments of the plurality of spokes.

27. The bicycle wheel assembly of claim 20, wherein the first damping element applies the first damping force to every other spoke segment of the plurality of spokes.

28. The bicycle wheel assembly of claim 20, wherein the hub assembly comprises a brake rotor attachment member disposed about the hub axis and outboard of the damper assembly along the hub axis.

29. The bicycle wheel assembly of claim 20, wherein the rim is made from a fiber reinforced plastic.

\* \* \* \* \*